(12) United States Patent
Dunn et al.

(10) Patent No.: US 9,424,239 B2
(45) Date of Patent: Aug. 23, 2016

(54) MANAGING SHARED STATE INFORMATION PRODUCED BY APPLICATIONS

(71) Applicant: Microsoft Corporation, Redmond, WA (US)

(72) Inventors: Alan M. Dunn, Austin, TX (US); Tadayoshi Kohno, Seattle, WA (US); David A. Molnar, Seattle, WA (US); Alexander N. Moshchuk, Kirkland, WA (US); Franziska Roesner, Seattle, WA (US); Jiahe Helen Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 14/020,723

(22) Filed: Sep. 6, 2013

(65) Prior Publication Data

US 2015/0074506 A1 Mar. 12, 2015

(51) Int. Cl.
 *G06T 19/00* (2011.01)
 *G06F 17/24* (2006.01)
 *G06F 3/0481* (2013.01)
 *G06F 21/62* (2013.01)

(52) U.S. Cl.
 CPC ............ *G06F 17/241* (2013.01); *G06F 3/0481* (2013.01); *G06F 21/6218* (2013.01); *G06T 19/006* (2013.01)

(58) Field of Classification Search
 None
 See application file for complete search history.

(56) References Cited

U.S. PATENT DOCUMENTS

| 6,085,976 | A  | 7/2000  | Sehr |
| 7,693,545 | B2 | 4/2010  | Park |
| 7,706,837 | B2 | 4/2010  | Ladouceur |
| 7,856,652 | B2 | 12/2010 | Hieda |
| 7,996,879 | B1 | 8/2011  | Fang et al. |
| 8,219,144 | B2 | 7/2012  | Benco et al. |
| 8,254,902 | B2 | 8/2012  | Bell et al. |
| 8,326,272 | B1 | 12/2012 | Patro |
| 8,331,739 | B1 | 12/2012 | Abdulkader et al. |
| 8,719,605 | B2 | 5/2014  | Chakra et al. |

(Continued)

FOREIGN PATENT DOCUMENTS

WO WO2009145730 A1 12/2009

OTHER PUBLICATIONS

PCT Written Opinion for PCT/US2014/053769, mailed on Jul. 22, 2015, 9 pages.

(Continued)

*Primary Examiner* — Daniel Hajnik
(74) *Attorney, Agent, or Firm* — Alin Corie; Sandy Swain; Micky Minhas

(57) ABSTRACT

A shared renderer maintains shared state information to which two or more augmented reality application contribute. The shared renderer then provides a single output presentation based on the shared state information. Among other aspects, the shared renderer includes a permission mechanism by which applications can share information regarding object properties. The shared renderer may also include: a physics engine for simulating movement of at least one object that is represented by the shared state information; an annotation engine for managing a presentation of annotations produced by plural applications; and/or an occlusion engine for managing the behavior of the output presentation when two or more objects, produced by two or more applications, overlap within the output presentation.

20 Claims, 23 Drawing Sheets

(56) References Cited

U.S. PATENT DOCUMENTS

| | | | |
|---|---|---|---|
| 8,732,619 B2* | 5/2014 | Knitowski | G06F 3/04812 715/835 |
| 8,744,143 B2 | 6/2014 | Chen | |
| 2001/0044775 A1 | 11/2001 | Saito et al. | |
| 2003/0081621 A1 | 5/2003 | Godfrey et al. | |
| 2004/0267410 A1 | 12/2004 | Duri et al. | |
| 2006/0004581 A1 | 1/2006 | Claudatos et al. | |
| 2006/0048142 A1 | 3/2006 | Roese et al. | |
| 2006/0064384 A1 | 3/2006 | Mehrotra et al. | |
| 2007/0162966 A1 | 7/2007 | Agrawal et al. | |
| 2007/0250410 A1 | 10/2007 | Brignone et al. | |
| 2008/0016335 A1 | 1/2008 | Takahashi et al. | |
| 2008/0180243 A1 | 7/2008 | Aaron | |
| 2008/0307527 A1 | 12/2008 | Kaczmarski et al. | |
| 2009/0141940 A1 | 6/2009 | Zhao et al. | |
| 2009/0259591 A1 | 10/2009 | Starostin et al. | |
| 2009/0313254 A1 | 12/2009 | Mattox et al. | |
| 2009/0322890 A1 | 12/2009 | Bocking et al. | |
| 2010/0040288 A1 | 2/2010 | Yen et al. | |
| 2010/0077484 A1 | 3/2010 | Paretti et al. | |
| 2010/0107220 A1 | 4/2010 | Nguyen | |
| 2010/0211666 A1 | 8/2010 | Kvernvik et al. | |
| 2010/0226535 A1* | 9/2010 | Kimchi | G06F 3/013 382/103 |
| 2010/0235519 A1 | 9/2010 | Hu et al. | |
| 2011/0143811 A1 | 6/2011 | Rodriguez | |
| 2012/0019683 A1 | 1/2012 | Susanu et al. | |
| 2012/0042076 A1 | 2/2012 | Kawa et al. | |
| 2012/0069051 A1 | 3/2012 | Hagbi et al. | |
| 2012/0192247 A1 | 7/2012 | Oliver et al. | |
| 2012/0218296 A1* | 8/2012 | Belimpasakis | G06T 17/05 345/633 |
| 2012/0222083 A1 | 8/2012 | Vaha-Sipila et al. | |
| 2012/0249741 A1* | 10/2012 | Maciocci et al. | 348/46 |
| 2012/0311131 A1 | 12/2012 | Arrasvuori | |
| 2012/0311708 A1 | 12/2012 | Agarwal et al. | |
| 2013/0044128 A1 | 2/2013 | Liu et al. | |
| 2013/0050262 A1 | 2/2013 | Jeon, II | |
| 2013/0117840 A1 | 5/2013 | Roesner et al. | |
| 2013/0132084 A1 | 5/2013 | Stonehocker et al. | |
| 2013/0239192 A1* | 9/2013 | Linga | G06F 21/44 726/7 |
| 2013/0263016 A1* | 10/2013 | Lehtiniemi et al. | 715/753 |
| 2013/0303077 A1 | 11/2013 | Ohmata et al. | |
| 2014/0009609 A1 | 1/2014 | Webster et al. | |
| 2014/0196152 A1 | 7/2014 | Ur et al. | |
| 2014/0282840 A1 | 9/2014 | Guinan | |

OTHER PUBLICATIONS

Molnar, et al., "Protecting Privacy in Web-Based Immersive Augmented Reality," U.S. Appl. No. 14/082,051, filed Nov. 14, 2013, 68 pages.
"Another way to attract women to conferences: photography policies," available at <<http://adainitiative.org/2013/07/another-way-to-attract-women-to-conferences-photography-policies/>>, The Ada Initiative, Jul. 4, 2013, 4 pages.
Avidan, et al., "Blind Vision," In Proceedings of the 9th European Conference on Computer Vision, 2006, 13 pages.
Hengartner, et al., "Protecting Access to People Location Information," In Security in Pervasive Computing, Lecture Notes in Computer Science, vol. 2802, 2004, 15 pages.
Borisov, et al., "Active Certificates: A Framework for Delegation," In Proceedings of the Network and Distributed System Security Symposium, 2002, 11 pages.
"CES 2011—Wearable HD 3D cameras by GOPRO," available at <<http://vimeo.com/18554202>>, butterscotch, access page for a video having a duration of 2.44 minutes, 2011, 2 pages.
Choe, et al., "Living in a Glass House: A Survey of Private Moments in the Home," In Proceedings of the 13th International Conference on Ubiquitous Computing, 2011, 4 pages.
Choe, et al., "Investigating Receptiveness to Sensing and Inference in the Home Using Sensor Proxies," In Proceedings of the 2012 ACM Conference on Ubiquitous Computing, 2012, 10 pages.
Clark, et al., "SoK: SSL and HTTPS: Revisiting past challenges and evaluating certificate trust model enhancements," In Proceedings of IEEE the Symposium on Security and Privacy, May 2013, 15 pages.
"Hands-on with Google Glass: Limited, fascinating, full of potential," available at <<http://reviews.cnet.com/google-glass/>>, Aug. 12, 2013, CNET.com, CBS Interactive Inc., with linked video presentation, CBS Interactive Inc., 25 pages.
"Qualcomm Fast Computer Vision SDK," available at <<http://www.cnx-software.com/2011/10/28/qualcomm-fast-computer-vision-sdk/>>, CNXSoft—Embedded Software Development, Oct. 2011, 5 pages.
"The Fitbit Story," available at <<http://www.fitbit.com/story>>, accessed on Jan. 20, 2014, Fitbit, Inc., San Francisco, CA, 11 pages.
Haldar, et al., "Semantic Remote Attestation—A Virtual Machine directed approach to Trusted Computing," In Proceedings of the Third Virtual Machine Research and Technology Symposium, 2004, 18 pages.
Hudson, et al., "Predicting Human Interruptibility with Sensors: A Wizard of Oz Feasibility Study," In Proceedings of SIGCHI Conference on Human Factors in Computing Systems, 2003, 8 pages.
Kharouni, Loucif, "The Dangers of Posting Credit Cards, IDs on Instagram and Twitter," available at <<http://blog.trendmicro.com/trendlabs-security-intelligence/the-dangers-of-posting-credit-cards-ids-on-instagram-and-twitter/>>, Security Intelligence Blog, Trend Micro Inc., Dec. 4, 2012, 4 pages.
Lasecki, et al., "Real-Time Crowd Labeling for Deployable Activity Recognition," In Proceedings of the 2013 Conference on Computer Supported Cooperative Work, Feb. 23, 2013, 10 pages.
Kotadia, Munir, "Jamming device aims at camera phones," available at <<http://news.cnet.com/2100-1009-5074852.html>>, CNET.com, CBS Interactive Inc., Sep. 3, 2003, 4 pages.
Lee, et al., "π Box: A Platform for Privacy-Preserving Apps," Proceedings of the 10th USENIX Symposium on Network Systems Design and Implementation, Apr. 2013, 15 pages.
Likamwa, et al., "Energy Characterization and Optimization of Image Sensing Toward Continuous Mobile Vision," Proceeding of the 11th Annual International Conference on Mobile Systems, Applications, and Services, Jun. 25, 2013, 13 pages.
Lioy, et al., "Trusted Computing," Handbook of Information and Communication Security, Stravroulakis, et al. (Eds.), 2010, 21 pages.
Massimi, et al., "Understanding Recording Technologies in Everyday Life," IEEE Pervasive Computing, vol. 9, Issue 3, Jul. 2010, 8 pages.
Tate, Ryan, "Google Glass Reborn as Something You'd Actually Want to Wear," available at <<http://www.wired.com/business/2013/08/meta_glass/>>, Wired, Aug. 19, 2013, 7 pages.
"Creating Your Own Code Access Permissions," available at <<http://msdn.microsoft.com/en-us/library/yctbsyf4(v=vs.90).aspx>>, Microsoft Developer Network, Microsoft Corporation, Redmond, WA, accessed on Jan. 20, 2013, 2 pages.
O'Brien, Kevin, "Swiss Court Orders Modifications to Google Street View," available at <<http://www.nytimes.com/2012/06/09/technology/09iht-google09.html?_r=0>>, New York Times, Jun. 8, 2012, 3 pages.
Paruchuri, et al., "Video Data Hiding for Managing Privacy Information in Surveillance Systems," EURASIP Journal on Information Security, Article No. 7, 2009, 18 pages.
Priyantha, et al., "The Cricket Compass for Context-Aware Mobile Applications," In Proceedings of 7th Annual International Conference on Mobile Computing and Networking, 2001, 14 pages.
Sorrel, Charlie, "Word Lens: Augmented Reality App Translates Street Signs Instantly," available at <<http://www.wired.com/gadgetlab/2010/12/word-lens-augmented-reality-app-translates-street-signs-instantly/>>, Wired, Dec. 17, 2010, 4 pages.
"RunKeeper," available at <<http://en.wikipedia.org/wiki/RunKeeper>>, accessed on Jan. 20, 2014, Wikipedia online article, 2 pages.
"After Modifications, Google Street View Approved for Switzerland," available at <<http://yro.slashdot.org/story/12/06/09/1645213/after-modifications-google-street-view-approved-for-switzerland>>, Soulskill, Slashdot, Jun. 9, 2012, 14 pages.
Tennenhouse, et al., "A Survey of Active Network Research," In IEEE Communications Magazine, vol. 35, Issue 1, 1997, 7 pages.

(56) References Cited

OTHER PUBLICATIONS

"Google Glasses Banned," available at <<http://the5pointcafe.com/google-glasses-banned/>>, The 5 Point Café, Mar. 11, 2013, 4 pages.
Simonite, Tom, "Bringing Cell-Phone Location-Sensing Indoors," available at <<http://www.geoconnexion.com/articles/bringing-cell-phone-location-sensing-indoors/>>, accessed on Jan. 20, 2013, GeoConnexion, 3 pages.
Whitney, Lance, "Google Glass Code Lets You Snap a Photo with a Wink," available at <<http://news.cnet.com/8301-1023_3-57582500-93/google-glass-code-lets-you-snap-a-photo-with-a-wink/>>, May 2, 2013, CNET.com, CBS Interactive Inc., 21 pages.
Beresford, Alastair R., "Location Privacy in Ubiquitous Computing," available at <<http://www.cl.cam.ac.uk/research/dtg/www/publications/public/arb33/UCAM-CL-TR-612.pdf>>, Technical Report 612, 2005, University of Cambridge Computer Laboratory, Cambridge, UK, 139 pages.
Liao, Tony, "A Framework for Debating Augmented Futures: Classifying the Visions, Promises and Ideographs Advanced About Augmented Reality," Proceedings of the IEEE International Symposium on Mixed and Augmented Reality, Nov. 5, 2012, 10 pages.
Gruteser, et al., "Privacy-Aware Location Sensor Networks," Proceedings of the 9th Workshop on Hot Topics in Operating Systems, 2003, 6 pages.
Ferreira, et al., "Security and Privacy in a Middleware for Large Scale Mobile and Pervasive Augmented Reality," In Proceedings of International Conference on Software, Telecommunications and Computer Networks, 2007, 5 pages.
Wang, et al., "Computerized-Eyewear Based Face Recognition System for Improving Social Lives of Prosopagnosics," In Proceedings of the Conference on Pervasive Computing Technologies for Healthcare and Workshops, Mar. 2013, 4 pages.
Dabrowski, et al., "Framework based on Privacy Policy Hiding for Preventing Unauthorized Face Image Processing," Nov. 20, 2013, 7 pages.
Kohno, et al., "World-Driven Access Control Using Trusted Certificates," U.S. Appl. No. 14/166,774, filed Jan. 28, 2013, 79 pages.
Namee, et al., "Motion in Augmented Reality Games: An Engine for Creating Plausible Physical Interactions in Augmented Reality Games," retrieved at <<http://acm.org>>, International Journal of Computer Games Technology, vol. 2010, Article No. 4, Jan. 2010, 8 pages.
D'Antoni, et al., "Operating System Support for Augmented Reality Applications," retrieved at <<http://www.cs.utexas.edu/~adunn/pubs/13hotos-aros.pdf>>, Proceedings of the 14th Workshop on Hot Topics in Operating Systems (HotOS), May 2013, 7 pages.
Sherstyuk, et at., "Virtual Roommates in Multiple Shared Spaces," retrieved at <<http://www.ugcs.caltech.edu/~andrei/PDF/roommates.isvri.2011.pdf>>, Proceedings of the IEEE International Symposium on VR Innovation, Mar. 19, 2011, 8 pages.
Grasset, et al., "Image-Driven View Management for Augmented Reality Browsers," retrieved at <<http://ieeexplore.ieee.org/stamp/stamp.jsp?tp=&arnumber=6402555>>, Proceedings of the IEEE International Symposium on Mixed and Augmented Reality, Nov. 2012, pp. 177-186.
Kaufmann, et al., "Simulating Educational Physical Experiments in Augmented Reality," retrieved at <<http://acm.org>>, Proceedings of ACM SIGGRAPH ASIA Educators Programme, Dec. 2008, Article No. 3, 8 pages.
Lang, et al., "Massively Multiplayer Online Worlds as a Platform for Augmented Reality Experiences," retrieved at <<http://nguyendangbinh.org/Proceedings/VR/2008/vr/sketches/lang.pdf>>, Proceedings of the IEEE Virtual Reality Conference, Mar. 2008, pp. 67-70.
"Method and System for Disabling Camera Feature of a Mobile Device," retrieved at <<http://www.ibridgenetwork.org/nanyangpolytechnic/method-and-system-for-disabling-camera-feature-of-a-mobile-de>>, ibridge, Nanyang Polytechnic, Singapore, posted on Jun. 18, 2002, 1 page.
Roesner, et al., "Providing Intent-Based Access to User-Owned Resources," U.S. Appl. No. 13/368,334, filed Feb. 8, 2012, 80 pages.

"Layar Catalogue," retrieved at <<http://www.layar.com/layers/>>, retrieved on Aug. 7, 2013, Layar U.S., New York, NY, 5 pages.
"Project Glass," retrieved at <<https://plus.google.com/+projectglass/posts>>, retrieved on Jun. 4, 2013, Google Inc., Googleplex, California, 10 pages.
Ardagna, et al., "Privacy-enhanced Location-based Access Control," retrieved at <<http://spdp.di.unimi.it/papers/location_chapter.pdf>>, in Handbook of Database Security, 2008, pp. 531-552.
Barton, et al., Letter from the U.S. Congress Bi-Partisan Privacy Caucus to Larry Page, regarding Google Glass, retrieved at <<http://joebarton.house.gov/images/GoogleGlassLtr_051613.pdf, May 2013, 3 pages.
Bauer, et al., "Device-enabled Authorization in the Grey System," retrieved at <<http://users.ece.cmu.edu/~jmmccune/papers/grey-isc05.pdf>>, Proceedings of the 8th International Conference on Information Security, 2005, pp. 431-445.
Brassil, Jack, "Technical Challenges in Location-Aware Video Surveillance Privacy," retrieved at <<http://www.hpl.hp.com/techreports/2008lHPL-2008-213.pdf>>, HP Laboratories, Report No. HPL-2008-213, Hewlett-Packard, Palo Alto, CA, 23 pages.
Cammozzo, Alberto, "What is TagMeNot?," retrieved at <<http://tagmenot.info/>>, retrieved on Aug. 7, 2013, 2 pages.
Halderman, et al., "Privacy Management for Portable Recording Devices," retrieved at <<http://acm.org>>, Proceedings of the 2004 ACM Workshop on Privacy in the Electronic Society, 2004, pp. 16-24.
Hurst, M. "The Google Glass feature no one is talking about," retrieved at <<http://creativegood.com/blog/the-google-glass-feature-no-one-is-talking-about/>>, creative good, Feb. 28, 2013, 35 pages.
Jana, et al., "Fine Grained Permissions for Augmented Reality Applications," retrieved at <<http://research.microsoft.com/apps/pubs/default.aspx?id=183680>>, Microsoft Technical Report No. MSR-TR-2013-11, Microsoft Corporation, Redmond, WA, Feb. 2013, 1 page.
"Convergence Beta," retrieved at <<http://convergence.io/>>, Thoughtcrime Labs Production, retrieved on Aug. 7, 2013, 1 page.
"Convergence Beta Details," retrieved at <<http://convergence.io/details.html>>, Thoughtcrime Labs Production, retrieved on Aug. 7, 2013, 2 pages.
Patel, et al., "BlindSpot: Creating Capture-Resistant Spaces," retrieved at <<http://www.cc.gatech.edu/~summetj/papers/BlindSpot-Book_Chapter-2009.pdf>>, Protecting Privacy in Video Surveillance, A. Senior (Ed.), Springer-Verlag, 2009, pp. 185-201.
Schiff, et al., "Respectful Cameras: Detecting Visual Markers in Real-Time to Address Privacy Concerns," IROS 2007, IEEE/RSJ International Conference on Intelligent Robots and Systems, Oct. 2007, pp. 971-978.
Starner, Thad, "The Challenges of Wearable Computing: Part 2," IEEE Micro, vol. 21, No. 4, 2001, pp. 54-67.
Murphy, David, "Seattle Bar Bans Google Glass. Who's Next?," retrieved at <<http://www.pcmag.com/article2/0,2817,2416421,00.asp>>, PCMAG.com, Mar. 9, 2013, 5 pages.
Kohno, et al., "World-Driven Access Control," U.S. Appl. No. 14/020,735, filed Sep. 6, 2013, 63 pages.
D'Antoni, et al., "Managing Access by Applications to Perceptual Information," U.S. Appl. No. 14/020,708, filed Sep. 6, 2013, 85 pages.
Jana, et al., "Enabling Fine-Grained Permissions for Augmented Reality Applications with Recognizers," retrieved at <<https://www.usenix.org/system/files/conference/usenixsecurity13/sec13-paper_jana.pdf>>, Proceedings of the 22nd USENIX Security Symposium, Aug. 14, 2013, 17 pages.
Vidas, et al., "QRishing: The Susceptibility of Smartphone Users to QR Code Phishing Attacks," retrieved at <<http://www.cylab.cmu.edu/files/pdfs/tech_reports/CMUCyLab12022.pdf>>, Report No. CMU-CyLab-12-022, Carnegie Mellon University, Pittsburgh, PA, Nov. 2012, 13 pages.
Jana, et al., "A Scanner Darkly: Protecting User Privacy from Perceptual Applications," retrieved at <<http://www.cs.utexas.edu/~shmat/shmat_oakl3darkly.pdf>>, Proceedings of the 2013 IEEE Symposium on Security and Privacy, May 19, 2013, 15 pages.

(56) References Cited

OTHER PUBLICATIONS

Ferreira, et al., "Security and Privacy in a Middleware for Large Scale Mobile and Pervasive Augmented Reality," retrieved at <<http://ieeexplore.ieee.org/stamp/stamp.jsp?tp=&arnumber=4446125>>, 15th International Conference on Software, Telecommunications and Computer Networks, Sep. 2007, 5 pages.

"Augmented Reality and Privacy," retrieved at <<http://www.arlab.com/blog/augmented-reality-and-privacy/>>, Augmented Reality Lab S.L, Madrid, Spain, accessed on Jun. 5, 2013, 4 pages.

Friedman, et al., "New Directions: A Value-Sensitive Design Approach to Augmented Reality," retrieved at <<http://www.vsdesign.org/publications/pdf/friedman00newdirections.pdf>>, Proceedings of DARE 2000 on Designing Augmented Reality Environments, 2000, pp. 163-164.

Aryan, et al., "Securing Location Privacy in Augmented Reality," retrieved at <<http://ieeexplore.ieee.org/stamp/stamp.jsp?tp=&arnumber=5578714>>, 5th International Conference on Industrial and Information Systems, Jul. 29, 2010, pp. 172-176.

Szalavari, et al., "Collaborative Gaming in Augmented Reality," retrieved at <<http://www.cg.tuwien.ac.at/research/vr/gaming/mahjongg/vrst98.pdf>>, Proceedings of the ACM Symposium on Virtual Reality Software and Technology, 1998, 10 pages.

Azuma, Ronald T. "A Survey of Augmented Reality," retrieved at <<http://www.cs.unc.edu/~azuma/ARpresence.pdf>>, Presence: Teleoperators and Virtual Environments, vol. 6, Issue 4, Aug. 1997, 48 pages.

Azuma, et al., "Recent Advances in Augmented Reality," retrieved at <<http://ieeexplore.ieee.org/stamp/stamp.jsp?tp=&arnumber=963459>>, IEEE Computer Graphics and Applications, vol. 21, Issue 6, Nov. 2001, pp. 34-47.

Beresford, et al., "MockDroid: Trading Privacy for Application Functionality on Smartphones," retrieved at <<http://acm.org>>, Proceedings of the 12th Workshop on Mobile Computing Systems and Applications, Mar. 2011, pp. 49-54.

Chu, et al., "Mobile Apps: It's Time to Move Up to CondOS," retrieved at <<http://research.microsoft.com/pubs/147238/chu.pdf>>, Proceedings of the 13th Workshop on Hot Topics in Operating Systems, May 2011, 5 pages.

"Kinect for Xbox 360 Privacy Considerations," retrieved at <<http://www.microsoft.com/privacy/technologies/kinect.aspx>>, retrieved on Aug. 7, 2013, Microsoft Corporation, Redmond, WA, 1 page.

"Kinect for Windows SDK," retrieved at <<http://www.microsoft.com/en-us/kinectforwindows/develop/new.aspx>>, retrieved on Aug. 7, 2013, Microsoft Corporation, Redmond, WA, 1 page.

Dwork, Cynthia, "The Differential Privacy Frontier," retrieved at <<http://131.107.65.14/pubs/80240/dwork-tcc09.pdf>>, Proceedings of the 6th Theory of Cryptography Conference on Theory of Cryptography, Mar. 2009, 7 pages.

Enck, et al., "TaintDroid: an Information-Flow Tracking System for Realtime Privacy Monitoring on Smartphones," retrieved at <<https://www.usenix.org/legacy/event/osdi10/tech/full_papers/Enck.pdf>>, Proceedings of 9th USENIX Symposium on Operating Systems Design and Implementation, Oct. 2010, 15 pages.

Felt, et al., "Android Permissions: User Attention, Comprehension, and Behavior," retrieved at <<http://acm.org>>, Proceedings of the Eighth Symposium on Usable Privacy and Security, Article No. 3, Jul. 2012, 14 pages.

"OpenCV," retrieved at <<http://opencv.org/about.html>>, retrieved on Aug. 7, 2013, 2 pages.

Guha, et al., "Koi: A Location-Privacy Platform for Smartphone Apps," retrieved at <<https://www.usenix.org/system/files/conference/nsdi12/nsdi12-final118.pdf>>, Proceedings of 9th USENIX Symposium on Networked Systems Design and Implementation, Apr. 2012, 14 pages.

Hornyack, et al., "These Aren't the Droids You're Looking For: Retrofitting Android to Protect Data from Imperious Applications," retrieved at <<http://homes.cs.washington.edu/~pjh/pubs/hornyack_appfence_ccs2011.pdf>>, Proceedings of the 18th ACM Conference on Computer and Communications Security, Oct. 2011, pp. 639-651.

Howell, et al., "What You See is What They Get: Protecting Users from Unwanted Use of Microphones, Cameras, and Other Sensors," retrieved at <<http://research.microsoft.com/pubs/131132/devices-camera-ready.pdf>>, Proceedings of the Web 2.0 Security and Privacy Workshop, May 2010, 9 pages.

Hutchings, Emma, "Augmented Reality Lets Shoppers See How New Furniture Would Look At Home," retrieved at <<http://www.psfk.com/2012/05/augmented-reality-furniture-app.html>>, PSFK Labs, New York, NY, May 18, 2012, 3 pages.

Krumm, John, "A Survey of Computational Location Privacy," retrieved at <<http://acm.org>>, Personal and Ubiquitous Computing, vol. 13, Issue 6, Aug. 2009, pp. 391-399.

"What is Layar," retrieved at <<http://www.layar.com/what-is-layar/>>, retrieved on Aug. 7, 2013, Layar US, New York, NY, 2 pages.

"Microsoft Research Face SDK Beta," retrieved at <<http://research.microsoft.com/en-us/projects/facesdk/>>, retrieved on Aug. 7, 2013, Microsoft Corporation, Redmond, WA, 2 pages.

"Microsoft Speech Platform," retrieved at <<http://msdn.microsoft.com/en-us/library/hh361572(v=office.14).aspx>>, retrieved on Aug. 7, 2013, Microsoft Corporation, Redmond, WA, 3 pages.

Newcombe, et al., "KinectFusion: Real-Time Dense Surface Mapping and Tracking," retrieved at <<http://ieeexplore.ieee.org/stamp/stamp.jsp?tp=&arnumber=6162880>>, Proceedings of the 10th IEEE International Symposium on Mixed and Augmented Reality, Oct. 2011, pp. 127-136.

Poh, et al., "Advancements in Noncontact, Multiparameter Physiological Measurements Using a Webcam," retrieved at <<http://ieeexplore.ieee.org/stamp/stamp.jsp?tp=&arnumber=5599853>>, IEEE Transactions on of Biomedical Engineering, vol. 58, Issue 1, Jan. 2011, pp. 7-11.

"Google Glass," retrieved at <<http://en.wikipedia.org/wiki/Google_Glass>>, retrieved on Aug. 7, 2013, Wikipedia article, 6 pages.

"Qualcomm Vuforia," retrieved at <<http://www.qualcomm.com/solutions/augmented-reality>>, retrieved on Aug. 7, 2013, QUALCOMM Incorporated, San Diego, CA, 2 pages.

Roesner, et al., "User-Driven Access Control: Rethinking Permission Granting in Modern Operating Systems," retrieved at <<http://research.microsoft.com/pubs/152495/user-driven-access-control-nov2011.pdf>>, Microsoft Technical Report No. MSR-TR-2011-91, Microsoft Corporation, Redmond, WA, Aug. 2011, 16 pages.

Shotton, et al., "Real-time Human Pose Recognition in Parts from a Single Depth Image," retrieved at <<http://research.microsoft.com/pubs/145347/bodypartrecognition.pdf>>, Proceedings of the 24th IEEE Conference on Computer Vision and Pattern Recognition, Jun. 2011, 8 pages.

"Instantl.y Survey Creator," retrieved at <<http://www.instantly/>>, retrieved on Jun. 4, 2013, United Sample, Encino, CA, 4 pages.

Viola, et al., "Robust Real-time Object Detection," International Journal of Computer Vision, vol. 57, Issue 2, May 2004, pp. 137-154.

Abrash, Michael, "Latency —The sine qua non of AR and VR," retrieved at <<http://blogs.valvesoftware.com/abrash/latency-the-sine-qua-non-of-ar-and-vr/>>, Ramblings in Valve Time, a blog by Michael Abrash, Dec. 29, 2012, 80 pages.

Aiken, et al., "Deconstructing Process Isolation," retrieved at <<http://acm.org>>, Proceedings of the 2006 Workshop on Memory System Performance and Correctness, Oct. 22, 2006, 10 pages.

D'Antoni, et al., "FAST: A Transducer-Based Language for Tree Manipulation," retrieved at <<http://research.microsoft.com/pubs/179252/msr-tr-2012-123.pdf>>, Microsoft Research Technical Report No. MSR-TR-2012-123, Microsoft Corporation, Redmond, WA, Nov. 2012, 11 pages.

Dowty, et al., "GPU Virtualization on VMware's Hosted I/O Architecture," retrieved at <<http://static.usenix.org/events/wiov08/tech/full_papers/dowty/dowty.pdf>>, USENIX Workshop on I/O Virtualization, Dec. 2008, 8 pages.

Engler, et al., "Exterminate all Operating System Abstractions," retrieved at <<http://ieeexplore.ieee.org/stamp/stamp.jsp?tp=&arnumber=513459>>, Proceedings of the Fifth Workshop on Hot Topics in Operating Systems, May 1995, 6 pages.

(56) References Cited

OTHER PUBLICATIONS

Felt, et al., "How to Ask for Permission," retrieved at <<https://www.usenix.org/system/files/conference/hotsec12/hotsec12-final19.pdf>>, Proceedings of the 7th USENIX Conference on Hot Topics in Security, Aug. 2012, 6 pages.
"Clickjacking," retrieved at <<http://ha.ckers.org/blog/20080915/clickjacking/>>, retrieved on Jun. 5, 2013, 11 pages.
Gauger, Eliza, "Sonic-Style Grey Goo Cripples Second Life," retrieved at <<http://www.wired.com/gamelife/2006/11/sonicstyle_grey/>>, WIRED Magazine, Nov. 21, 2006, 4 pages.
Kaashoek, et al., "Application Performance and Flexibility on Exokernel Systems," retrieved at <<http://acm.org>>, Proceedings of the Sixteenth ACM Symposium on Operating Systems Principles, 2007, pp. 52-65.
"Grey Goo Fence," retrieved at <<http://lslwiki.net/lslwiki/wakka.php?wakka=GreyGooFence>>, retrieved on Aug. 7, 2013, LSL Wiki, 2 pages.
Poulsen, Kevin, "Hackers Assault Epilepsy Patients via Computer," retrieved at <<http://www.wired.com/politics/security/news/2008/03/epilepsy>>, WIRED magazine, Mar. 28, 2008, 1 page.
Nightingale, et al., "Helios: Heterogeneous Multiprocessing with Satellite Kernels," retrieved at <<http://acm.org>>, Proceedings of the ACM SIGOPS 22nd Symposium on Operating Systems Principles, Oct. 2009, pp. 221-234.
Roesner, et al., "User-Driven Access Control: Rethinking Permission Granting in Modern Operating Systems," retrieved at <<http://ieeexplore.ieee.org/stamp/stamp.jsp?tp=&arnumber=6234415>>, Proceedings of the IEEE Symposium on Security and Privacy, May 20, 2012, pp. 224-238.
Willow Garage, retrieved at <<http://www.willowgarage.com/pages/about-us>>, retrieved on Aug. 7, 2013, Willow Garage, Inc., Menlo Park, CA, 2 pages.
Viola, et al., "Robust Real-time Object Detection," retrieved at <<http://www.hpl.hp.com/techreports/Compaq-DEC/CRL-2001-1.pdf>>, Technical Report No. CRL 2001/01, Compaq Computer Corporation, Cambridge, MA, Feb. 2001, 30 pages.
"Willow Garage," retrieved at <<http://en.wikipedia.org/wi ki/Willow_Garage>>, retrieved on Aug. 7, 2013, Wikipedia article, 4 pages.
PCT Search Report and Written Opinion for PCT/US2014/053769, mailed on Dec. 9, 2014, 13 pages.
"Augmented, Reality," available at <<http://en.wikipedia.org/w/index.php?titile=Augmented_reality&oldid=571607624>>, Wikipedia, the free encyclopedia, Sep. 5, 2013, retrieved on Nov. 27, 2014, 19 pages.
Levy, Henry M., Capability-Based Computer Systems, Butterworth-Heinemann, Newtown, MA, USA, Dec. 31, 1984, 230 pages.
"About Willow Garage," retrieved at <<http://www.willowgarage.com/pages/about-us>> on Aug. 7, 2013, Willow Garage, Inc., Menlo Park, CA, 2 pages.
Denning et al., "In Situ with Bystanders of Augmented Reality Glasses: Perspectives on Recording and Privacy-Mediating Technologies," ACM CHI, 2014, Apr. 26-May 1, 2014, Toronto, ON, Canada, 10 pages.
Geambasu et al., "Comet: An active distributed key-value store," University of Washington, USENIX OSDI, 2010, 14 pages.
Gray, Richard, "The places where Google Glass is banned," Dec. 5, 2013, <<http://www.telegraph.co.uk/technology/google/10494231/The-places-where-Google-Glass-is-banned.html>>, 15 pages.
Meta, Inc "Spaceglasses," Oct. 3, 2013, Retrieved at <<https://www.spaceglasses.com/>>, 3 pages.
Needadebitcard, "Please quit posting pictures of your debit cards, people," 2013, Retrieved at https://twitter.com/NeedADebitCard, 1 page.
Quest Visual, "WordLens: See the world in your language," retrieved at <<http://questvisual.com/>>, Jan. 23, 2014, 2 pages.
Szalavari et al., "Collaborative Gaming in Augmented Reality," Proceedings of the ACM Symposium on Virtual Reality Software and Technology, 1998, 10 pages.

Wendlandt et al., "Perspectives: Improving SSH-style Host Authentication with Multi-Path Probing," USENIX '08: 2008 Usenix Annual Technical Conference, USENIX Security Symposium, Jun. 2008, 15 pages.
Non-Final Office Action mailed Jun. 9, 2015 from U.S. Appl. No. 14/020,708, 14 pages.
Search Report and Written Opinion mailed on Dec. 1, 2014 from PCT Patent Application No. PCT/US2014/053963, 12 pages.
Article 34 Demand and Response filed Mar. 13, 2015 from PCT Patent Application No. PCT/US2014/053963, 23 pages.
Written Opinion mailed on Aug. 13, 2015 from PCT Patent Application No. PCT/US2014/053963, 7 pages.
Article 34 Demand and Response filed Mar. 23, 2015 to International Search Report and Written Opinion mailed Dec. 9, 2014 from PCT Patent Application No. PCT/US2014/053769, 24 pages.
Non-Final Office Action mailed Mar. 6, 2015 from U.S. Appl. No. 14/166,774, 28 pages.
Response filed May 7, 2015 to Non-Final Office Action mailed Mar. 6, 2015 from U.S. Appl. No. 14/166,774, 14 pages.
Final Office Action and Examiner Initiated Interview mailed Sep. 4, 2015 from U.S. Appl. No. 14/166,774, 32 pages.
PCT Search Report and Written Opinion for PCT/US2014/053771 mailed on Dec. 1, 2014 14 pages.
Written Opinion of the International Preliminary Examining Authority mailed Aug. 14, 2015 from PCT Patent Application No. PCT/US2014/053771, 6 pages.
Response filed Sep. 3, 2014 to Non-Final Office Action mailed Jun. 9, 2015 from U.S. Appl. No. 14/020,708, 15 pages.
Zimmerman, P.R., "The Official PGP User's Guide," MIT Press, Cambridge, MA, 1995.
Notice of Allowance mailed Sep. 16, 2015 from U.S. Appl. No. 14/020,708, 7 pages.
Corrected Notice of Allowability mailed Sep. 25, 2015 from U.S. Appl. No. 14/020,708, 2 pages.
Notice of Allowance mailed Dec. 18, 2015 from U.S. Appl. No. 14/020,708, 13 pages.
Corrected Notice of Allowability mailed Jan. 14, 2016 from U.S. Appl. No. 14/020,708, 6 pages.
Non-Final Office Action mailed Sep. 23, 2015 to U.S. Appl. No. 14/020,735, 16 pages.
Response tiled Dec. 2, 2015 to the Non-Final Office Action mailed Sep. 23, 2015 to U.S. Appl. No. 14/020,735, 12 pages.
Final Office Action mailed Dec. 18, 2015 from U.S. Appl. No. 14/020,735, 34 pages.
Response and After Final Consideration Pilot Program Request filed Feb. 26, 2016 from U.S. Appl. No. 14/020,735, 12 pages.
Advisory Action and AFCP 2.0 Decision mailed Mar. 4, 2016 from U.S. Appl. No. 14/020,735, 9 pages.
International Preliminary Report on Patentability mailed Nov. 20, 2015 from PCT Patent Application No. PCT/US2014/053963, 18 pages.
International Preliminary Report on Patentability mailed Nov. 5, 2015 from PCT Patent Application No. PCT/US2014/053769, 22 pages.
Response filed Nov. 27, 2015 to Final Office Action mailed Sep. 4, 2015 from U.S. Appl. No. 14/166,774, 14 pages.
Response and Demand filed Mar. 13, 2015 to International Search Report and Written Opinion mailed Dec. 1, 2014 from PCT Patent Application No. PCT/US2014/053771, 17 pages.
International Preliminary Report on Patentability mailed Nov. 24, 2015 from PCT Patent Application No. PCT/US2014/053771, 16 pages.
Notice of Allowance mailed Apr. 12, 2016 from U.S. Appl. No. 14/020,735, 9 pages.
Notice of Allowance mailed Mar. 17, 2016 from U.S. Appl. No. 14/020,708, 12 pages.
Corrected Notice of Allowability mailed Apr. 28, 2016 from U.S. App. No. 14/020,708, 6 pages.
Response filed Jun. 3, 2016 to the Official Communication pursuant to Rule 161 mailed Apr. 13, 2016 from European Patent Application No. 14771666.6, 24 pages.

(56) References Cited

OTHER PUBLICATIONS

Non-Final Office Action mailed May 24, 2106 from U.S. Appl. No. 14/166,774, 55 pages.
Supplemental Notice of Allowability mailed Jun. 20, 2016 from U.S. Appl. No. 14/020,735, 6 pages.
Supplemental Notice of Allowabilty mailed Jun. 10, 2016 from U.S. Appl. No. 14/020,735, 6 pages.
Official Communication pursuant to Rule 161 mailed Apr. 13, 2016 from European Patent Application No. 14771666.6, 2 pages.
Communication pursuant to Rules 161(1) and 162 EPC mailed Apr. 13, 2016 from European Patent Application No. 14771690.6, 2 pages.
Response filed May 25, 2016 to the Communication pursuant to Rules 161(1) and 162 EPC mailed Apr. 13, 2016 from European Patent Application No. 14771690.6, 25 pages.
Communication pursuant to Rules 161(1) and 162 EPC mailed Apr. 13, 2016 from European Patent Application No. 14771668.2, 2 pages.

* cited by examiner

MANAGING SHARED STATE INFORMATION PRODUCED BY APPLICATIONS

BACKGROUND

An augmented reality application typically provides an output presentation which combines information captured from the environment with some type of supplemental information. For example, one type of augmented reality application presents an image of the environment, together with labels that annotate objects within the image. Another type of augmented reality application provides a figure which duplicates the actual movement of a human user, together with a virtual object with which the user may interact.

An application that captures information from the surrounding environment raises privacy concerns. For example, the above-described augmented reality applications capture images or videos of the environment; that information, in turn, can potentially include sensitive items, such as human faces, personal writing, account numbers, etc. The "owner" of this private information will often prefer or insist that the information is not released to unauthorized parties. Such an undesirable release can occur in various circumstances. In a first case, an unauthorized application may extract the private information from information that it obtains through a computing device's sensing mechanisms (e.g., a video camera, microphone, etc.). In a second case, an unauthorized application may obtain the private information from another augmented reality application.

In practice, a developer may create an augmented reality application as a "one-off" self-contained unit of code. Similarly, a computing device may execute the application as a standalone unit of functionality. If the user wishes to run another augmented reality application on the same computing device, he or she may close down the first application and start up the second application. Pursuant to this approach, each developer may address the above-described privacy concerns in a separate—typically ad hoc—manner, within the application code itself

SUMMARY

A shared renderer is described herein which manages shared state information. The shared state information is produced by two or more augmented reality applications, each of which contributes objects and other information to the shared state information. For example, two or more augmented reality applications may sense the same environment and create two different sets of labels associated with entities within the environment. The shared renderer can represent those labels as parts of the shared state information. An output renderer presents a single output presentation based on this shared state information.

According to one illustrative aspect, each object may have zero, one, or more properties. Further, the shared renderer can associate permission information with each object property. The shared renderer includes a mechanism by which any application can share information regarding an object property with another application, based on the permission information.

According to another illustrative feature, the shared renderer may include a physics engine. The physics engine is configured to simulate movement of at least one object that is represented in the shared state information based on instructions from at least one application.

According to another illustrative feature, the shared renderer may include an annotation engine. The annotation engine is configured to manage a presentation of annotations produced by plural applications.

According to another illustrative feature, the shared renderer may include an occlusion engine. The occlusion engine is configured to manage the behavior of an output presentation when two or more objects, produced by two or more applications, overlap within the output presentation.

The above functionality can be manifested in various types of systems, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides an overview of a reality-sensing framework in which plural applications sense information from an environment and contribute to a shared output presentation. The applications may correspond to augmented reality applications and/or some other type of environmental-sensing applications. Section B sets forth illustrative methods which explain the operation of the functionality of Section A. Section C describes illustrative computing functionality that can be used to implement any aspect of the features described in Sections A and B.

Figure 27:
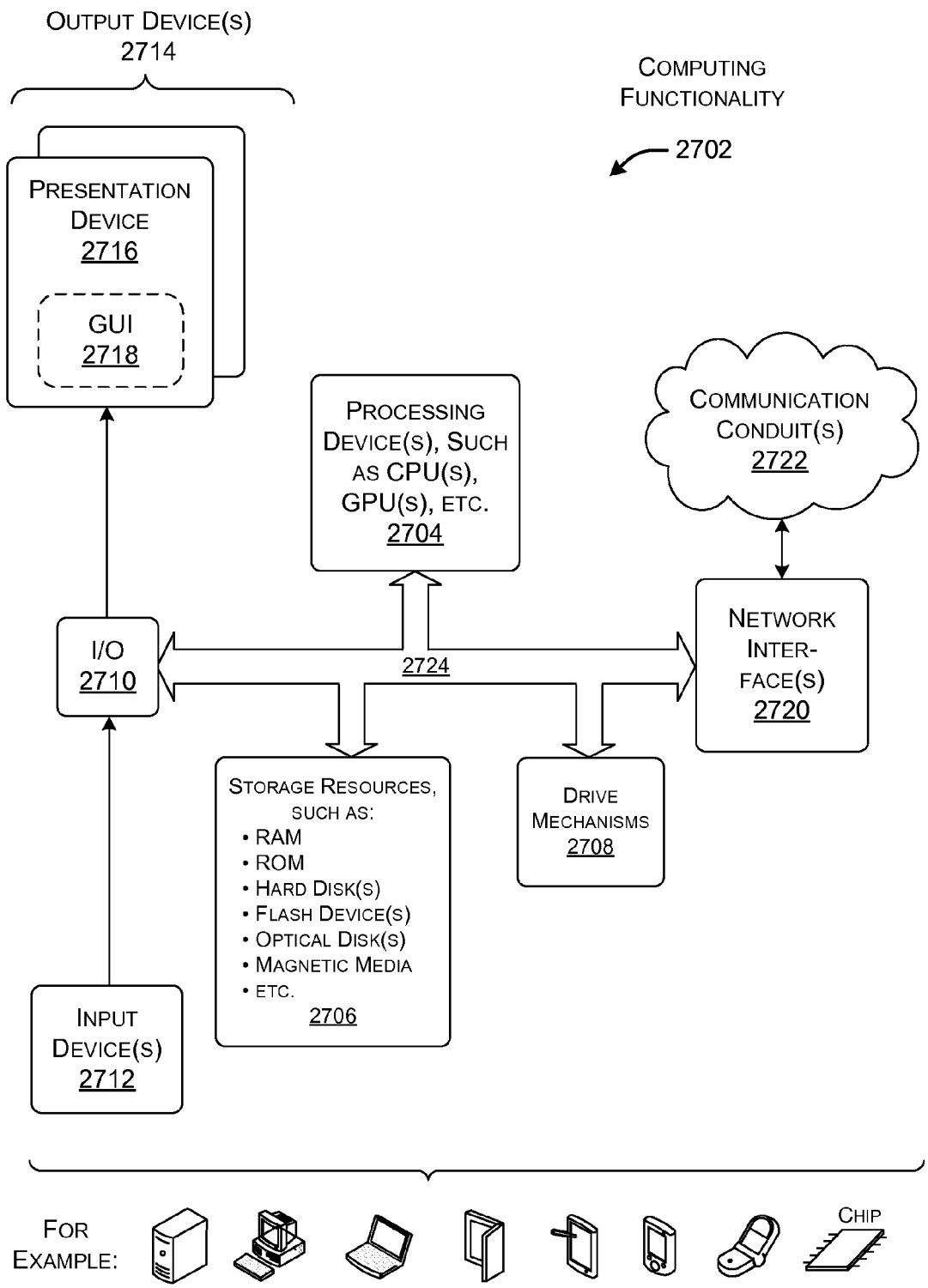
FIG. 27 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 27, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Reality-Sensing Framework

A.1. Overview of the Framework

This section describes a reality-sensing framework that hosts one or more augmented reality applications. As noted above, an augmented reality application operates by using one or more sensing mechanisms to capture any aspects of an environment. The application then generates some kind of supplemental information, such as a label, virtual object (e.g., an avatar), etc. The application then provides an output presentation which combines information regarding the environment with the supplemental information.

In other cases, the reality-sensing framework may host one or more other types of environment-sensing applications. These other types of environment-sensing applications capture aspects of environment, but do not combine a representation of the environment and supplemental information in the same manner described above. Nevertheless, to facilitate and simplify the description, the reality-sensing framework will be principally described herein with reference to augmented reality applications.

From a high-level perspective, the reality-sensing framework includes a recognition system for extracting different objects from the environment, based on perceptual information provided by one or more sensing mechanisms. Different augmented reality applications subscribe to and receive different types of objects generated by the recognition system. A single shared renderer receives and manages information generated by the augmented reality applications. The reality-sensing framework provides the output presentation based on shared state information maintained by the shared renderer.

Figure 1:
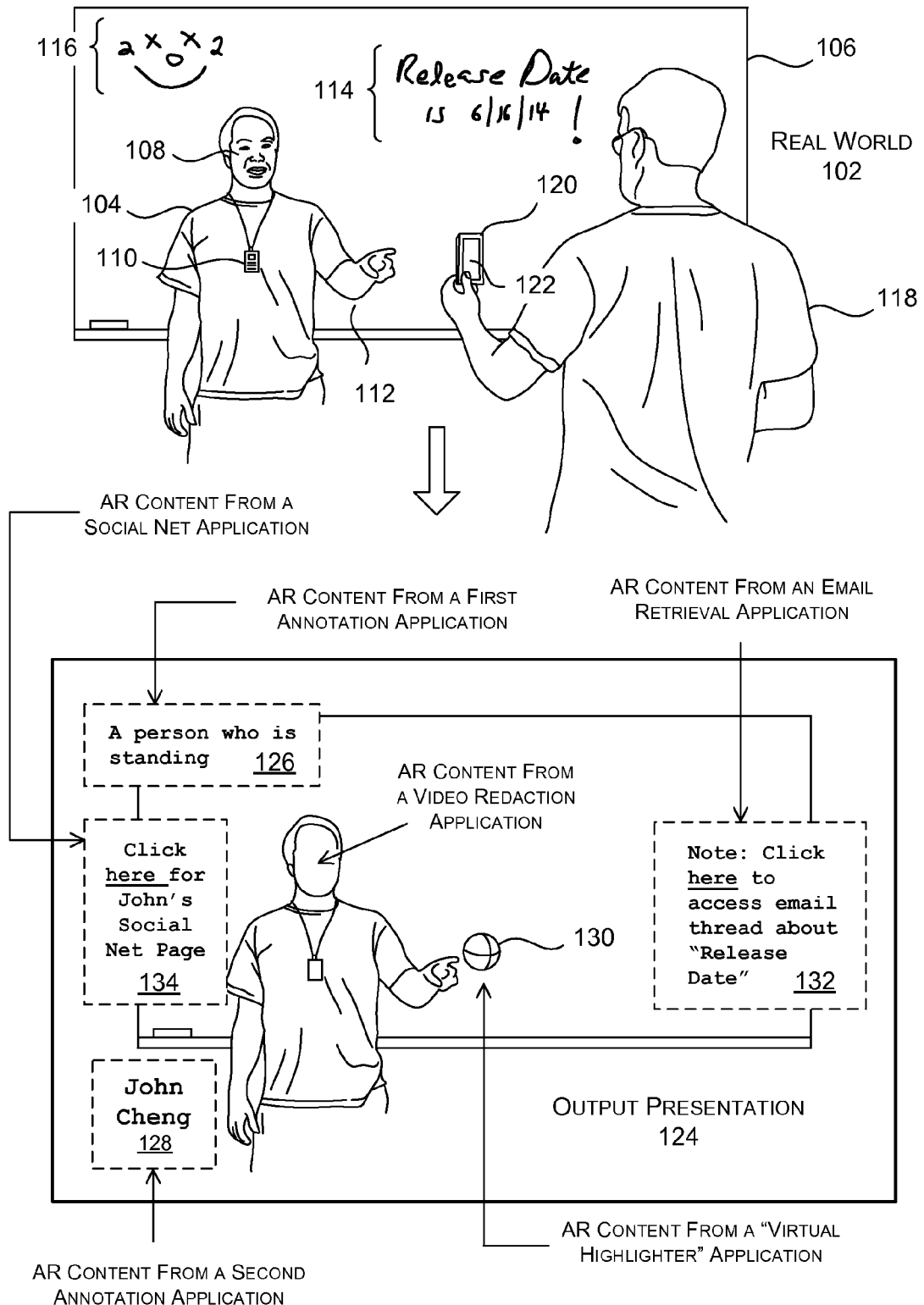
FIG. 1 shows an illustrative scenario in which plural augmented reality applications jointly contribute to an augmented reality experience.

But before delving into the illustrative specifics of the reality-sensing framework, consider the specific scenario depicted in FIG. 1, in which the reality-sensing framework is used to provide an augmented reality experience. That scenario will serve as a running example throughout this disclosure.

The real world 102 shown in FIG. 1 includes a first person 104 who is standing in front of a whiteboard 106. Among other characteristics, the first person 104 possesses a face 108 and a badge 110. Further, the first person 104 extends his arm 112 out, as if to point in a particular direction. The whiteboard 106 includes various instances of writing, such as writing 114 and writing 116.

A second person 118 captures the above-described scene using a computing device 120, such as a smartphone. More specifically, the second person 118 orients the computing device 120 such that its video camera (not shown) captures a video representation of at least the first person 104 and the whiteboard 106. The computing device 120 can also include one or more other environment sensing mechanism, such as, but not limited to, one or more microphones, one or more motion sensing devices (such as an accelerometer, gyroscope, etc.), and so on. These other sensing mechanisms may capture other aspects of the real world 102.

The computing device 120 may also include one or more output devices, such as a display mechanism 122. The display mechanism 122 provides an output presentation produced by the augmented reality applications. In the scenario shown in FIG. 1, the display mechanism 122 acts as a "window" to the real world 102, from the vantage point of the second person 118. In other words, the content presented on the display mechanism 122 mirrors the actual world in front of the computing device 120, as if the user was looking through a window onto the world.

However, other setups may be used to deliver an augmented reality experience. In another case, for instance, the second person 118 may interact with the augmented reality applications within a space created by one or more sensing mechanisms. For example, the second person 118 may operate within a field of view created by plural video cameras, each of which captures the second person 118 from a different vantage point. The second person 118 may consume the output presentation produced by the augmented reality applications on any output device, such as a display monitor that is placed in front of the second person 118.

In still another case, the second person 118 may interact with the augmented reality applications via any type of wearable computing device. For example, such a computing device may be affixed to eyewear, apparel, a watch, jewelry, or other wearable item. Any type of sensing mechanisms and output devices may be affixed or otherwise associated with the wearable item. For example, a video camera affixed to eyewear can capture a video representation of the scene in front of the second person 118, while a display mechanism affixed to the eyewear may deliver the output presentation provided by the augmented reality applications. The above-described form factors are cited by way of example, not limitation; still other arrangements are possible.

Assume, in the present example, that the reality-sensing framework includes five augmented reality applications working together to generate shared state information. The display mechanism 122 may present a single output presentation 124 based on the shared state information, as shown in the bottom portion of FIG. 1. From a high-level perspective, each of the five augmented reality applications provides a different instance of supplemental information, which contributes to the shared state information. The shared renderer combines the separate instances of the supplemental information, together with a visual (and/or audio) representation of the real world 102.

Assume that a first augmented reality application receives skeleton information from the recognition system. The skeleton information expresses a pose adopted by the first person 104. The first augmented reality application then generates labels based on the skeleton information and provides those labels to the output presentation 124. In the example of FIG. 1, the first augmented reality application provides a label 126 that indicates that the first person 104 constitutes "A person who is standing."

A second augmented reality application also adds labels to the output presentation 124, but operates in a different manner than the first augmented reality application. That is, the second augmented reality application receives face recognition data from the recognition system. The second augmented reality application then performs a lookup operation to match the face recognition data with one or more previously-registered instances of face recognition data, each of which is tagged with a name. The second augmented reality application then provides labels associated with one or more matching names on the output presentation 124. FIG. 1 shows one such label 128 generated by the second augmented reality application.

The first and second augmented reality applications described above are henceforth referred to as the first and second annotation applications, respectively. In general, the reality-sensing framework can work in conjunction with any number of annotation applications.

A third augmented reality application receives position data from the recognition system which indicates the positions of the first person's hands. The third augmented reality application then generates a virtual object, such as the virtual ball 130 shown in FIG. 1. The third augmented reality application then displays the virtual ball 130 in proximity to the position of the first person's outstretched hand. For example, the third augmented reality application can perform this function for the purpose of highlighting the position of a lecturer's outstretched hand. For ease of reference, this type of application is henceforth referred to as a virtual highlighter application. More generally, the above-described type of augmented reality application can provide any type of virtual object (or objects) to the output presentation 124. In some cases, a physics engine (to be described below) provided by the shared renderer animates a virtual object with realistic and/or fanciful dynamics.

A fourth augmented reality application receives text information from the recognition system. The recognition system, in turn, may regenerate the text information by processing an RGB representation of the whiteboard 106, using any type of text recognition technology, such as optical character recognition technology. In the specific example of FIG. 1, the recognition system receives an image of the writing 114 and converts it into the text, "Release Date is Jun. 16, 2014." The fourth augmented application then forms a search string based on the tokens in the text. It then uses the search string to search within a corpus of Email messages, and identifies any Email messages which match the search string. Finally, the fourth augmented reality application presents a prompt, such as prompt 132, which identifies the matching Email messages. The prompt 132 may also include a hyperlink or other control feature which allows the viewer to access the matching Email messages. The above-described augmented reality application is referred to below as an Email retrieval application.

A fifth augmented reality application receives the output of the second annotation application, which, in the example of FIG. 1, identifies the name of the first person 104 ("John Cheng"). The fifth augmented reality application can then present a prompt 134 which invites the viewer to access a social network page associated with the identified person (i.e., John Cheng). The fifth augmented reality application can display the prompt 134 in close proximity to the label 128. This augmented reality application is referred to below as a social network application.

As can be appreciated, the assortment of augmented reality applications described above is cited by way of illustration, not limitation. The reality-sensing framework can accommodate any number of augmented reality applications (including just one application), each of which may perform any function, and each of which may be active or inactive at any time.

As a clarifying comment, note that the output presentation 124 also includes a redacted depiction of the first person 104 and the whiteboard 106. The reality-sensing framework can present such a depiction in different ways. In one case, the reality-sensing framework can use a sixth augmented reality application to receive objects from the recognition system which represent the first person 104 and the whiteboard 106. For example, the recognition system can generate these objects by using a depth image (provided by a depth camera) to create a three dimensional model of the first person 104 and a three dimensional model of the whiteboard 106. The recognition system can then "paste" RGB information (provided by a video camera) onto the three dimensional models as texture information, to thereby produce realistic-looking objects associated with the first person 104 and the whiteboard 106. As shown, the recognition system can also optionally redact certain parts from these objects, such as the face 108 of the first person 104, the writing (114, 116) on the whiteboard 106, the writing on the badge 110, and so on. The sixth augmented reality application can then send the redacted objects to the output presentation 124.

In another implementation, the computing device 120 which implements the reality-sensing application can receive raw perceptual information from one or more sensing mechanisms, such as a video camera, a microphone, etc. The computing device 120 can then pass this raw perceptual information to the display mechanism 122 of the computing device 120, without also providing it to any of the augmented reality applications. Alternatively, or in addition, the computing device 120 can display a processed representation of the real world 102 provided by the recognition system, again without providing it to any of the augmented reality applications.

At this juncture, consider a few high-level aspects of the problem posed by the scenario shown in FIG. 1. The real world 102 includes several items which may be considered private or sensitive in nature. For example, the whiteboard contains writing (114, 116) that may contain secret information. For example, consider the case in which the first person 104 is an employee of a company, and that person has written the launch date of a commercial product (as conveyed by writing 114) on a company whiteboard 106. The company may wish to prevent that information from being released outside the company.

Similarly, the real world 102 encompasses the first person 104 himself That person 104 may consider his face 108, speech, badge 110, etc. as private information. As such, the first person 104 may wish to prevent these personal items from being communicated to non-authorized entities. In the scenario of FIG. 1, the second person 118 is capturing a representation of the first person 104; this arrangement means that the first person 104 will be the one who is primarily concerned about the release of personal information. But more generally, anyone who is encompassed by or indirectly impacted by a sensed environment may be concerned about breaches of privacy.

More precisely, there are various points of concern in the above-described scenario. First, an owner of private information may wish to restrict the type of information that each augmented reality application receives. Second, the owner of private information may wish to control the manner in which an augmented reality application, which has rightfully been given access to private information, is permitted to share the private information with other entities. For example, the first person may wish to restrict the second annotation application from sharing the detected name ("John Cheng") with another application. Third, the owner of the private information may wish to restrict the manner in which any augmented reality application outputs sensitive information, such as the manner in which any augmented reality displays the face 108 of the first person, etc. on the display mechanism 122 of the computing device 120.

A second technical challenge ensues from the fact that plural augmented reality applications are providing supplemental information to the same output presentation 124. There is a risk that the output of one augmented application may interfere with the output of other augmented reality applications.

Figure 2:
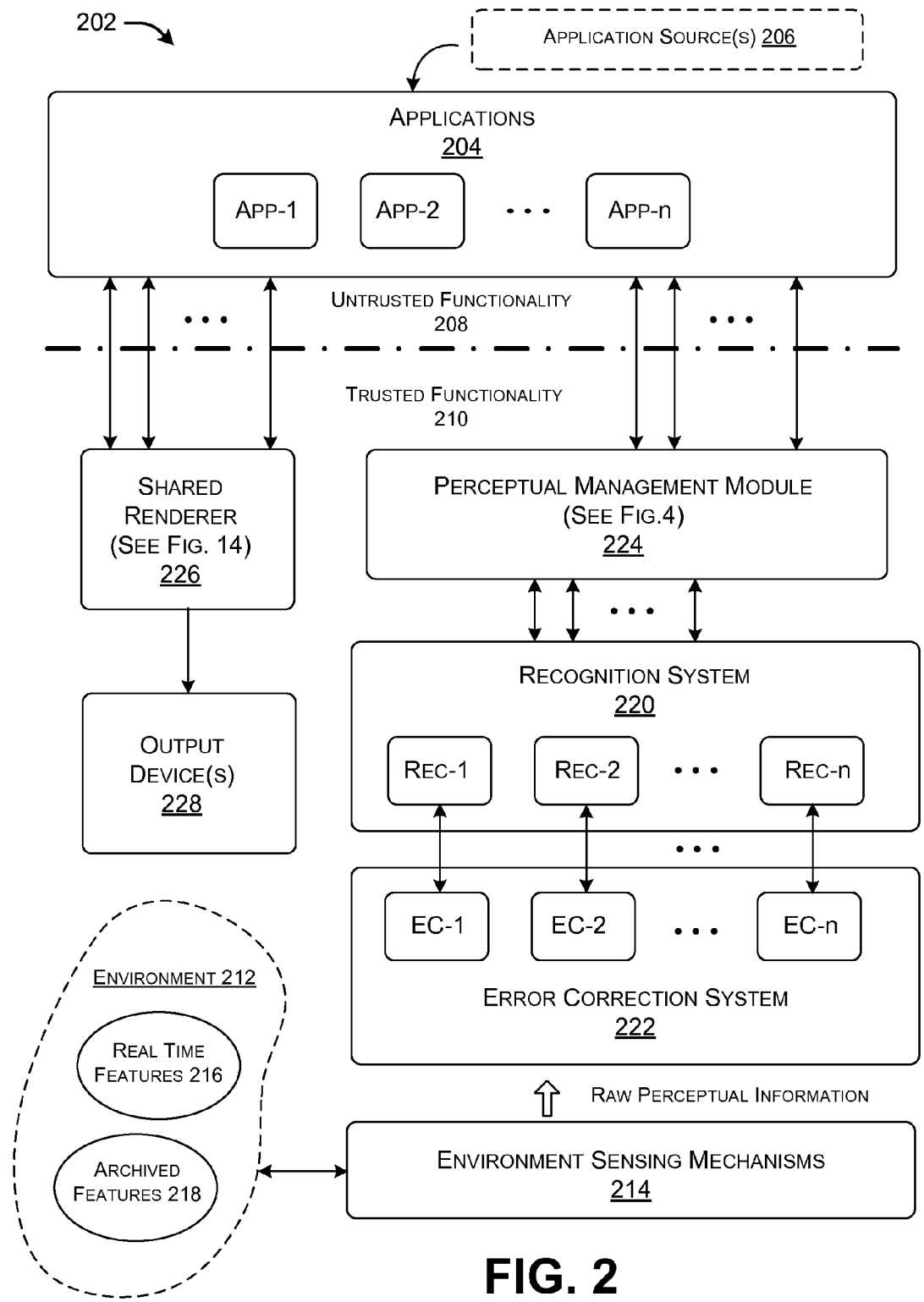
FIG. 2 shows an overview of an illustrative reality-sensing framework for delivering the augmented reality experience shown in FIG. 1.

Advancing to FIG. 2, this figure shows a reality-sensing framework 202 which provides a solution to at least the above-described problems. The reality-sensing framework 202 includes a collection of one or more augmented reality applications 204 and/or any other environment-sensing applications. The reality-sensing framework 202 may receive the applications 204 from any source(s) 206 in any manner. In one case, a user can explicitly download or otherwise obtain an augmented reality application from any source, such as an online marketplace of such applications. In another case, a user may more passively select an application, such as by visiting an online website which invokes the application, or by triggering any other event which automatically invokes the application. An application corresponds to a body of computer-implemented instructions, expressed in any computing language or combination of computing languages.

The applications 204 correspond to potentially untrusted functionality 208. The remainder of the reality-sensing framework 202 corresponds to trusted functionality 210. The untrusted functionality 208 is untrusted in the sense that it does not offer the same type of robust security guarantees as the trusted functionality 210. In one case, the trusted functionality 210 may be implemented, at least in part, by functionality provided by a computing device's operating system. In another case, the trusted functionality 210 can be provided, at least in part, by a software layer which resides between the operating system and the applications 204. Still other implementations of the trusted functionality 210 are possible.

The trusted functionality 210 includes two main flows of information. In the first main flow, the trusted functionality 210 extracts selected objects from a sensed environment 212 and sends them to the applications 204. In the second main flow, the applications 204 pass supplemental information to an output presentation. Subsection A.2 provides a detailed explanation of the first main flow, while Subsection A.3 provides additional details regarding the second main flow. The remainder of this subsection provides an overview of the overall reality-sensing framework 202. Note, however, that the functionality associated with the first main flow, as described in Subsection A.2, can be used in conjunction with other types of functionality, besides the functionality associated with the second main flow as described in Subsection A.3, and vice versa.

As to the first information flow, one or more environment sensing mechanisms 214 receive perceptual information from the environment 212. The environment 212 includes one or more features 216 which characterize the environment 212 in its present real-time state, such as entities and events within the real world 102 of FIG. 1. In addition, or alternatively, the environment 212 includes one or more archived features 218, providing historical perceptual information extracted from the environment 212 at some previous time or times.

The environment sensing mechanisms 214 can include any equipment for sensing any aspect of the environment 212. The environment sensing mechanisms 214 can include (but are not limited to): video cameras, still image cameras, movement sensing devices, microphones, vibration sensors, strain gauges, haptic input sensors, depth sensing mechanisms, and so on. A depth sensing mechanism can use any technique to capture depth information, such as a structured light technique, a time-of-flight technique, a stereoscopic technique, and so forth. One commercial system for capturing and processing depth images is the Kinect™ system provided by Microsoft Corporation® of Redmond, Wash.

A recognition system 220 extracts various higher-level items of information from the raw perceptual information. These items of information are referred to as objects herein, and can take any form. For example, consider the case in which one sensing mechanism provides raw video information. The recognition system 220 can determine whether the video information depicts a human subject. If so, the recognition system 220 can generate skeleton information from the video information which describes the real-time pose of the human subject. The recognition system 220 can then pass the skeleton information to one or more applications which request this information, in lieu of the raw video information. More specifically, the recognition system 220 includes one or more recognizers (e.g., Rec-1, Rec-2, . . . , Rec-n). Each recognizer generates a different abstract representation of the perceptual information obtained from the environment 212.

An error correction system 222 reduces the incidence of false positives in the output of the recognition system. More specifically, the error correction system 222 may include one more error correction mechanisms (EC-1, EC-2, . . . , EC-n), each of which works in conjunction with a particular recognizer (or recognizers). For example, the error correction mechanism EC-1 works in conjunction with the recognizer Rec-1 by reducing the incidence of false positives generated by the recognizer Rec-1. Each error correction mechanism can interact with its counterpart recognizer in any manner, such as by modifying the input information received by the recognizer, modifying the output information generated by the recognizer, and/or altering the internal processing performed by the recognizer.

For example, consider the writing 116 shown in FIG. 1. It is apparent to a human observer that this writing 116 represents some type of symbolic information, such as a mathematical or chemical formula. However, this writing 116 also somewhat resembles the features of a human face. A recognizer that generates face recognition data can be said to generate a false positive when it incorrectly interprets the writing 116 as a face. This is problematic from a security standpoint because the writing 116 may contain private information that is not intended to be sent to whatever application is authorized to receive face data. The error correction mechanism associated with this recognizer will reduce the likelihood that this false recognition will occur. Examples of how the error correction system 222 can perform its service will be set forth in greater detail at a later juncture of this description.

A perceptual management module 224 (henceforth referred to as just a "management module") manages the interaction between the applications 204 and the recognition system 220. For example, the management module 224 allows applications to subscribe to certain objects provided by the recognition system 220. The management module 224 then forwards those objects to the subscribing applications when new instances of those objects are provided by the recognition system 220.

Now referring to the second main flow identified above, a shared renderer 226 maintains shared state information. The shared state information combines objects that are generated by the various applications 204. The shared renderer 226 then provides an output presentation to one or more output devices 228, such as a display mechanism, speaker, etc.

The shared renderer 226 also implements various services. For example, the shared renderer provides a mechanism by which one application can share aspects of its output objects with one or more other applications. Further, the shared renderer 226 may implement any of a physics engine, an annotation engine, and/or an occlusion engine, all of which are described in Subsection A.3.

Overall, the reality-sensing framework 202 provides a solution to the above-noted challenges, described with reference to FIG. 1. First, the reality-sensing framework 202 can allow each application to access only that information that it requires to perform its functions, and nothing more. For example, the first annotation application can perform its functions based on skeleton information. It does not need raw video or depth information. As such, the reality-sensing framework 202 can prevent the first annotation application from receiving raw perceptual information; this constraint, in turn, prevents the first annotation application from receiving sensitive information which is expressed by the raw video information, such as the writing (114, 116) on the whiteboard 106, and the first person's face 108, etc. Second, the shared renderer 226 provides an efficient global mechanism for managing the manner in which each application can share object information with other applications, if permitted at all.

Overall, the reality-sensing framework 202 provides a technique for handling perceptual information that can be considered least privileged (because an application only gets the information that it needs), and fine grained (because an application can pick out and receive particular kinds of information items, rather than receiving more encompassing information on an all-or-nothing basis).

The shared renderer 226 also provides a global mechanism for managing the presentation of output information from two or more augmented reality applications. The shared renderer 226 can thereby reduce interference between applications which write to the same output space.

Moreover, the reality-sensing framework 202 provides the above solutions in a trusted and application-agnostic platform, rather than relying on the individual augmented reality applications to implement separate respective ad hoc solutions. This characteristic may promote acceptance of augmented reality technology among users, software developers, device manufacturers, and members of the public (who may feel impacted by the use of augmented reality applications by others).

Figure 3:
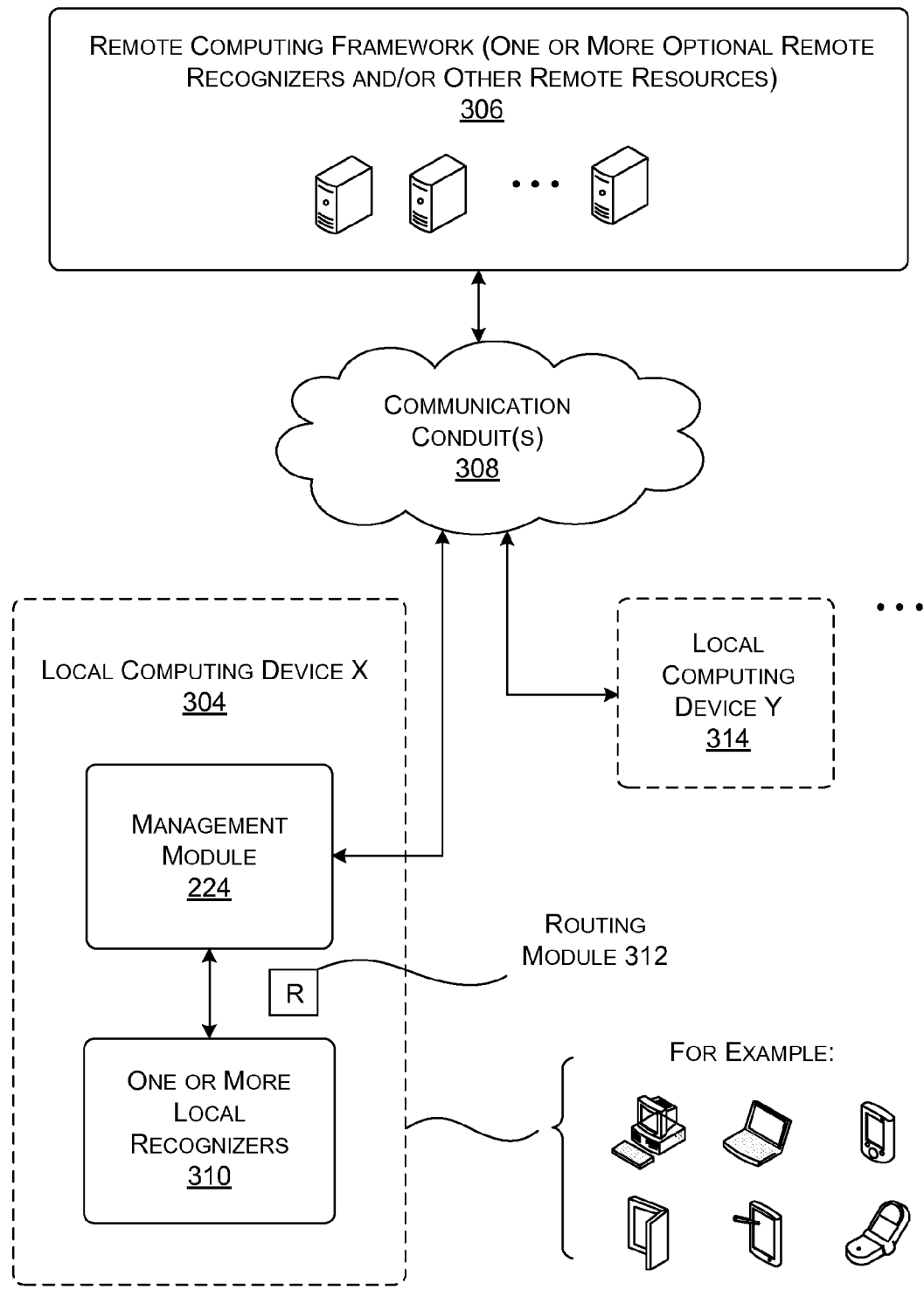
FIG. 3 shows illustrative computing functionality for implementing the reality-sensing framework of FIG. 2.

FIG. 3 shows one system 302 that can implement the reality-sensing framework 202 of FIG. 2. The system 302 includes at least one local computing device 304, such as any of a desktop personal computer, a laptop computer, a set-top box, a game console, a movement-sensing device (such as the Kinect™ device), a smartphone, a tablet computing device, and so on. In one case, the local computing device 304 implements all aspects of the reality-sensing framework 202 of FIG. 2 including the management module 224, the recognition system 220, and the shared renderer 226.

In another implementation, the local computing device 304 can implement some aspects of the reality-sensing framework 202, while a remote computing framework 306 may implement other aspects of the reality-sensing framework 202. In one implementation, the remote computing framework 306 may be implemented as one or more remote servers. The local computing device 304 may interact with the remote computing framework 306 via any communication conduit 308, such as a local area network, a wide area network (e.g., the Internet), or a point-to-point link, and so forth, or combination thereof.

In one illustrative allocation of functions, the local computing device 304 can implement one or more local recognizers 310, while the remote computing framework 306 can implement one or more remote recognizers. Hence, the recognition system 220 in this system 302 is distributed over at least two different locations. More specifically, the remote computing framework 306 can implement the most computationally intensive recognizers in the recognition system 220, such as those recognizers that perform complex image processing tasks (such as, in one case, a face recognition task).

In one implementation, the delegation of recognition tasks between the local computing device 304 and the remote computing framework 306 is static, or at least slowly varying. In another case, a routing module 312 can dynamically delegate tasks between the local computing device 304 and the remote computing framework 306 based on at least one computational workload factor and/or other consideration(s). For example, the routing module 312 can automatically delegate a recognition task to the remote computing framework 306 when the amount of uncompleted work in a workload queue exceeds a prescribed threshold. In addition, or alternatively, the routing module 312 can automatically migrate a recognition task from the local computing device 304 to the remote computing framework 306 if the task is taking more than a prescribed amount of time to complete on the local computing device 304, and/or based on other considerations. The routing module 312 may be implemented by the management module 224 and/or other component of the reality-sensing framework 202.

A remote recognizer may provide service to any number of local computing devices at the same time. For example, the remote recognizer may provide service to both the local computing device 304 and a local computing device 314. In this way, the remote recognizer simulates the operation of a virtual machine (by providing service to two or more independent tasks on the same physical platform), but without necessarily providing actual virtual machine functionality.

A.2. The Management Module and the Recognition System

Figure 4:
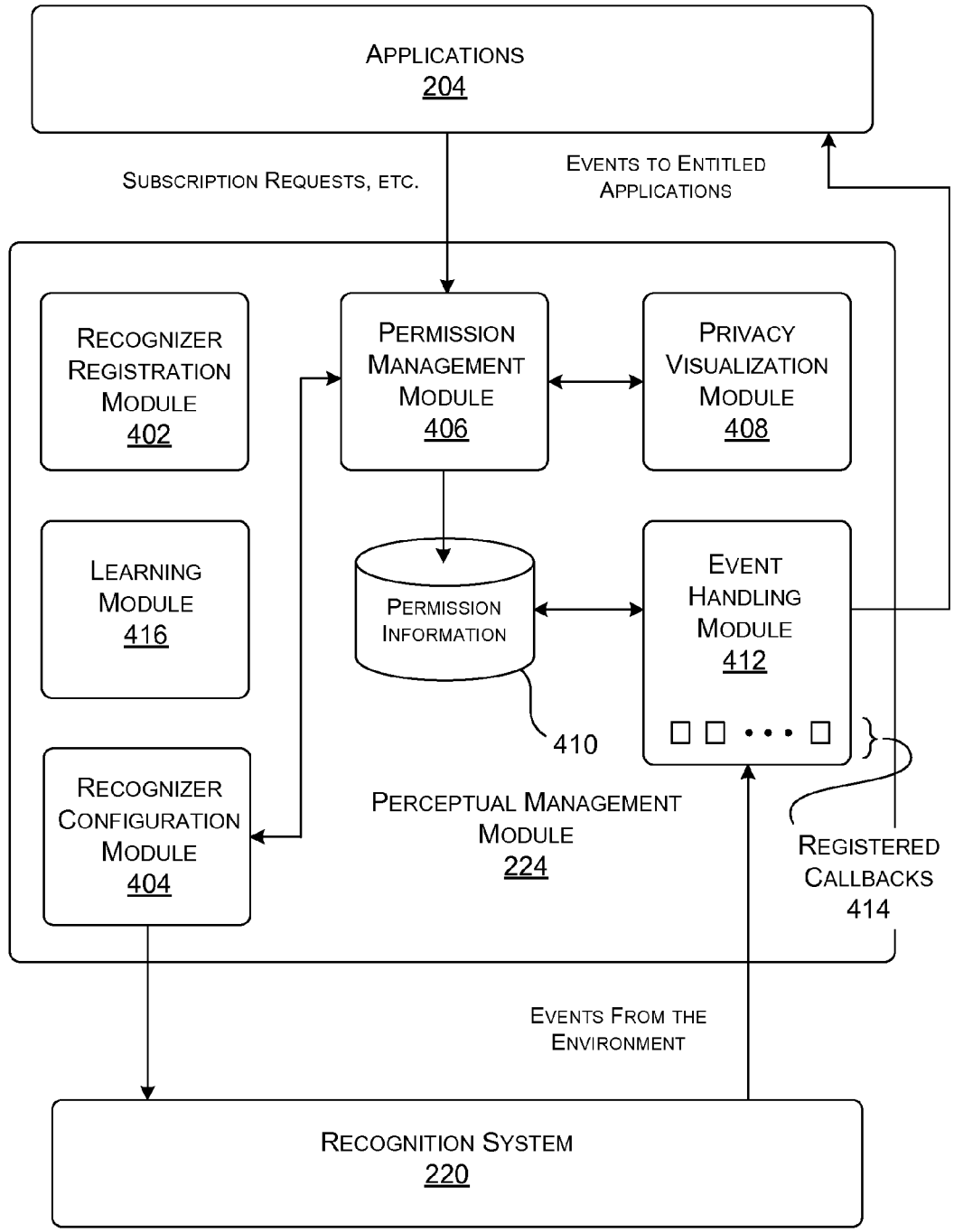
FIG. 4 shows an illustrative management module for managing a recognition system, where the management module and the recognition system are components of the reality-sensing framework of FIG. 2.

FIG. 4 shows one implementation of the management module 224, which was introduced with reference to FIG. 2. As noted in Subsection A.1, the management module 224 manages the interaction between the applications 204 and the recognition system 220. Later figures and accompanying explanation provide additional details regarding the recognition system 220.

The management module 224 includes plural components which perform different respective functions. A recognizer registration module 402 registers the names of the respective recognizers that are provided by the recognition system 220. The applications 204 make reference to the recognizers based on those registered names.

A recognizer configuration module 404 manages the configuration of each recognizer, and the configuration of the collection of recognizers as a whole. For example, in one case, the recognizer configuration module 404 can send a creation command to the recognition system 220, which instructs the recognition system to create an instance of a particular kind of recognizer. The recognizer configuration module 404 sends a destroy command to instruct the recognition system 220 to discard a previous instance of a particular recognizer, and to release any sensing mechanism resources associated with that recognizer. Upon creation, each recognizer may be inserted within a data flow graph, having zero, one, or more child nodes and zero, one, or more parent (and ancestor) nodes.

Each recognizer expresses the object or objects that it generates as an event. For example, an event that is generated by a recognizer that performs face recognition may contain a data structure that includes data that describes a face (but without including the full RGB representation of the face).

A permission management module 406 receives a request by an application to access certain objects, provided by respective recognizers. For example, in one implementation, the application can make this request at the time that a user seeks to install the application in the reality-sensing framework 202. In another case, the application can make this request each time the application seeks to access a prescribed object. The application can make such a request at yet other junctures.

In response to such a request, a privacy visualization module 408 presents a visual representation of the objects that an application seeks to access from the recognition system 220. The user can then provide feedback information which either grants or denies each identified access right. If the user accepts an access right, the permission management module 406 stores permission information in a data store 410 which indicates that the identified application has permission to access a particular object or collection of objects.

An event handling module 412 sends particular events to those applications that are entitled to receive the events, as determined based on the permission information stored in the data store 410. For example, in one implementation, the event handling module 412 can perform a query loop in which it calls each recognizer in sequence to determine if it has any new events being sought by the applications. If a new event is discovered, the event handling module 412 sends it to the applications which are entitled to receive it. The event itself, as mentioned above, expresses one or more objects. Instead of actively polling the recognizers in the manner described above, the recognizers can independently push their events to the event handling module 412, which then selectively forwards the events to the applications which are entitled to receive them. Still other strategies can be used to harvest events from the recognition system 220.

To perform the above functions, the applications 204 can register callbacks 414 in the event handling module 412. A callback informs the event handling module 412 what type of event that a particular application is entitled to receive, and where to send that event.

The event handling module 412 can also invoke particular functions when calling a recognizer, e.g., by invoking a particular application programming interface (API) provided by the recognizer. For example, by calling a comparison function, the event handling module 412 can instruct the recognizer to compare two instance of input information, such as two successive instances of perceptual information generated by a sensing mechanism. If the instances are the same, the recognizer can be configured to refrain from performing its recognition task on the later instance of perceptual information (since nothing has changed since the last instance of perceptual information was received). In another case, the event handling module 412 can instruct a recognizer to examine a particular portion of an instance of input information, such as a particular region within an image.

A learning module 416 modifies the behavior of any other component in the management module 224 and/or recognition system 220 based on feedback information regarding the performance of these components. For example, the learning module can detect that a particular recognizer is producing a high rate of false positives, or is infrequently used. Based on this information, the learning module 416 can decide to replace this recognizer with another recognizer that performs the same function. In another example, the learning module 416 can examine the volume or distribution of events received from the recognition system 220. Based on this information, the learning module 416 may decide to change the manner in which the event handling module 412 collects events from the recognition system 220.

Figure 5:
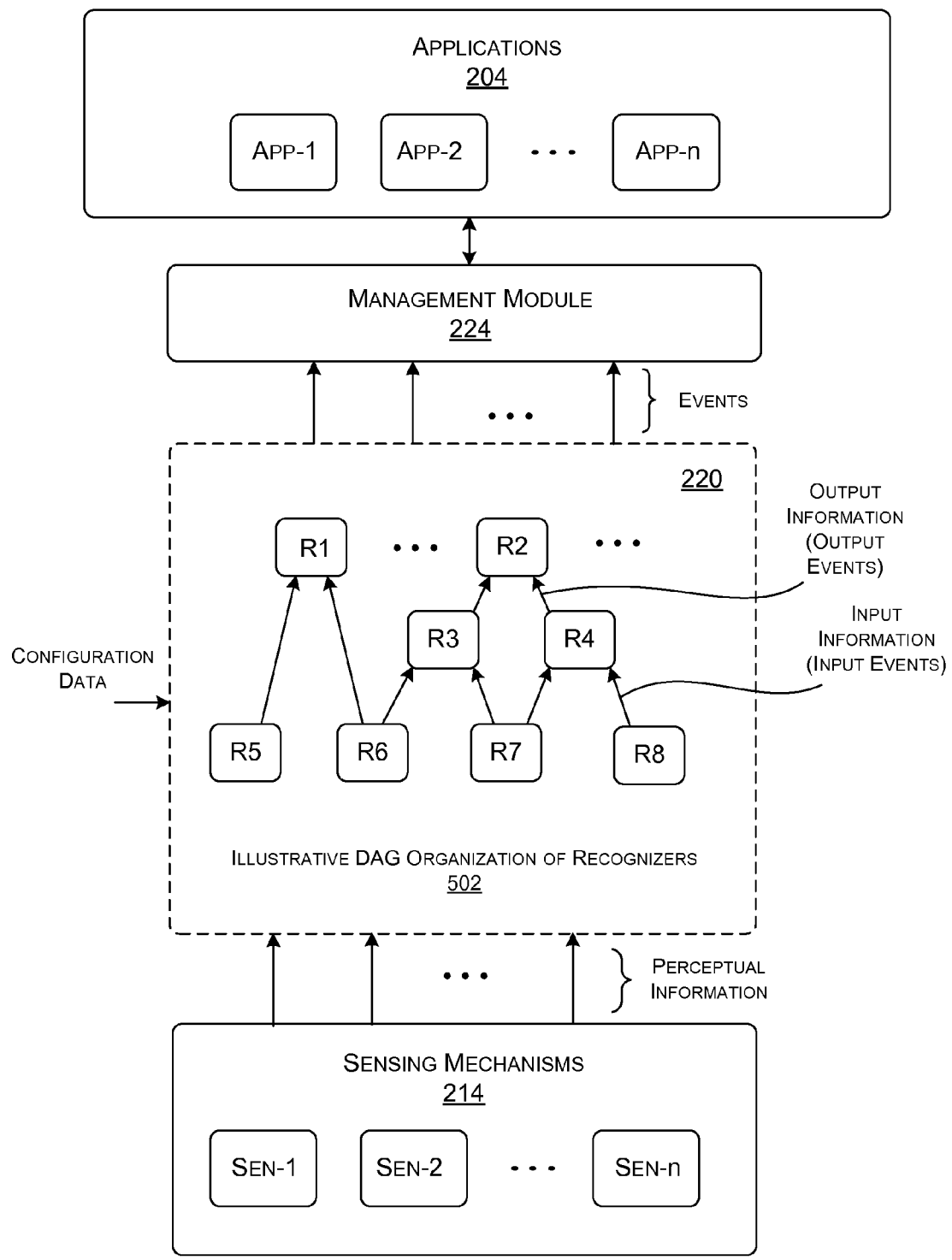
FIG. 5 shows one illustrative implementation of the recognition system of FIG. 4.

FIG. 5 shows one illustrative implementation of the recognition system 220. As noted above, the recognition system 220 may organize the recognizers (R1, R2, ... Rn) in a data flow graph 502, such as a directed acyclic graph (DAG). In that configuration, each recognizer receives input information from one or sources, processes the input information to identify the presence (or absence) of one or more objects in the input information, and generates output information which provides its results. As stated, a recognizer may express its output information as an event, which conveys the object(s) which have been detected, or the failure to detect such objects. The recipient of an event may be one or more applications and/or one or more other recognizers within the data flow graph 502.

Figure 6:
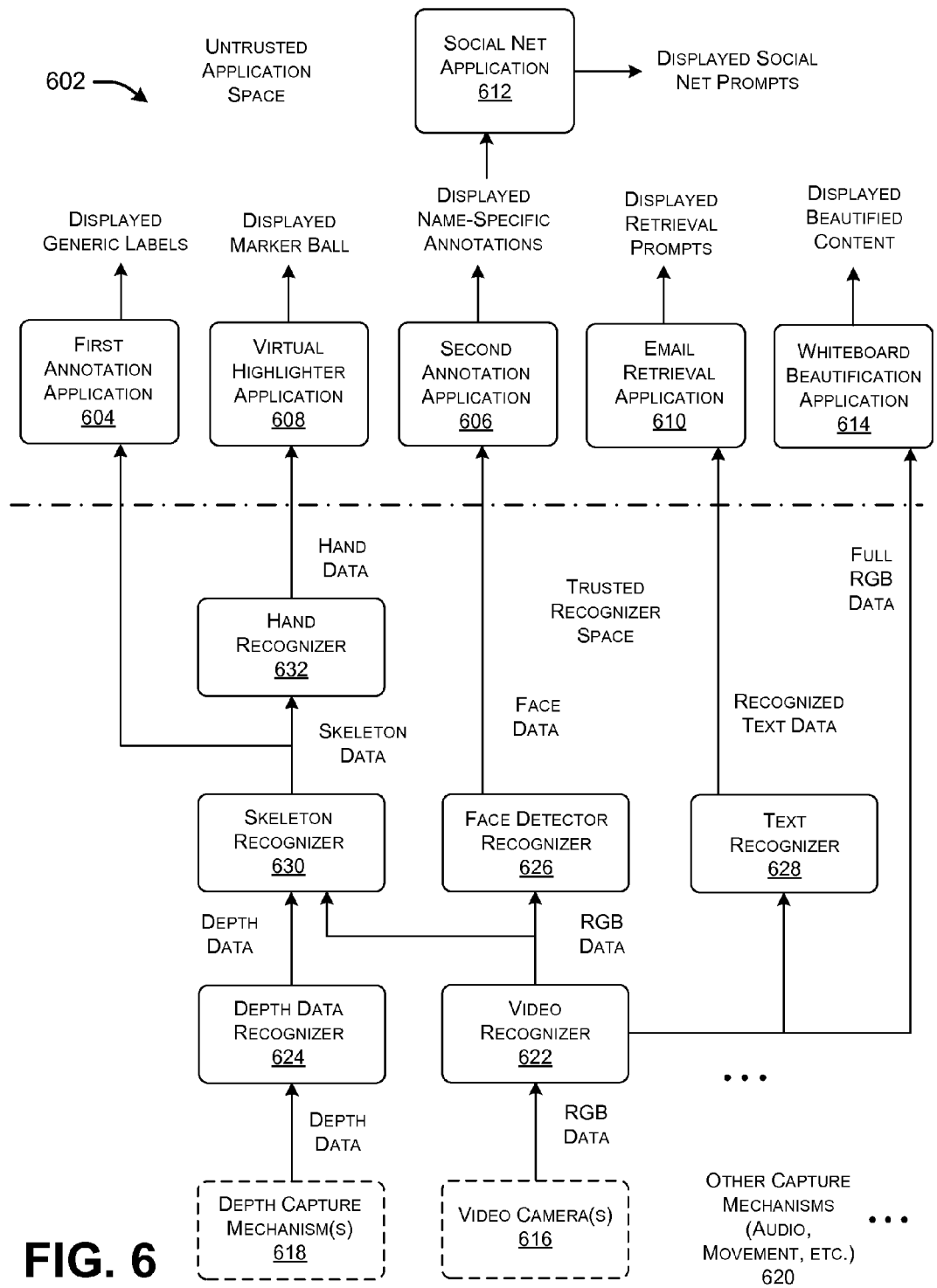
FIG. 6 shows one illustrative instantiation of the recognition system of FIG. 5.

FIG. 6 shows one illustrative instantiation of a recognition system 602. Assume that the reality-sensing framework 202 supports the five augmented reality applications described above, including a first annotation application 604, a second annotation application 606, a virtual highlighter application 608, an Email retrieval application 610, and a social network application 612. In addition, although not represented by FIG. 1, assume that the reality-sensing framework 202 supports a whiteboard beautification application 614, which converts handwritten writing on the whiteboard 106 into a beautified version thereof, e.g., by replacing the handwritten characters with formal counterparts. All of these applications receive events which are derived, either directly or indirectly, from perceptual information generated by one or more sensing mechanisms. The sensing mechanisms include one or more video cameras 616, one or more depth capture mechanisms 618, and one or more other capture mechanisms 620.

The recognition system 602 includes a collection of recognizers organized into a data flow graph. A video recognizer 622 may be viewed as a driver of the video cameras 616. It receives raw video information from the video cameras 616 and issues an output video event which expresses that video information. A depth data recognizer 624 may be considered a driver of the depth capture mechanisms 618. It receives a depth image from the depth data capture mechanisms 618 and issues an output depth event which expresses that depth image. (A depth image identifies the distances between points in a scene and a reference point.)

A face detector recognizer 626 receives a video event from the video recognizer 622. The face detector recognizer 626 analyzes the video information conveyed by that event to determine whether it contains a representation of the face of at least one human subject. If so, the face detector recognizer 626 issues an output event which expresses face data, but without expressing the full RGB representation of the subject's face.

A text recognizer 628 receives a video event, recognizes text in the video information contained in the video event (e.g., using optical character recognition technology or the like), and generates an output event which expresses the text data.

A skeleton recognizer 630 receives a depth event from the depth data recognizer 624 and a video event from the video recognizer 622. Based on this input information, the skeleton recognizer 630 generates a skeletonized representation of a human subject, if such a subject is present within the scene. In performing this task, the skeleton recognizer 630 can compare information extracted from the scene with a database of known possible body poses. The skeleton recognizer 630 expresses its findings as a skeleton event. A hand recognizer 632 receives the skeleton event as input information. Based on information expressed in that event, the hand recognizer 632 determines the positions and orientations of the user's hands. The hand recognizer 632 generates a hand event which expresses its findings.

In keeping with the principle of least privileged and fine-grained access, different applications consume different objects provided by different respective recognizers. The first annotation application 604 receives the skeleton event provided by the skeleton recognizer 630. The second annotation application 606 receives a face event generated by the face detector recognizer 626. The virtual highlighter application 608 receives a hand event from the hand recognizer 632. The Email retrieval application 610 receives a text event generated by the text recognizer 628. And the whiteboard beautification application 614 receives a raw video event generated by the video recognizer 622. The social network application 612 does not receive any data directly from the recognition system 602; rather, the social network application 612 receives name information that is shared by the second annotation application 606. Although not shown, any application may alternatively receive events from two or more recognizers.

Hence, it can be seen that only the whiteboard beautification application 614 receives raw information from a sensing mechanism. This provision enables the reality-sensing framework 202 to limit the exposure of private information to applications which actually need this information. For example, the first annotation application 604 cannot "see" the video information associated with the writing (114, 116) on the whiteboard 106, or the first person's face 108; it just receives data which indicates the positions and orientations of the first person's hands.

Although not shown in FIG. 6, a hypothetical seventh augmented reality application was described above, which constructs realistic-looking three-dimensional versions of objects in the real world 102. That application can receive information from a model-construction recognizer (not shown). That recognizer, in turn, may receive video events generated by the video recognizer 622 and depth events generated by the depth data recognizer 624. Based on the depth information, the model-construction recognizer can construct three-dimensional models of objects in the real world 102. The model-constructor recognizer can then paste the video information as a texture onto the models. The model-constructor recognizer can optionally also receive input from the face detector recognizer 626 and the text recognizer 628. Based on these inputs, the model-constructor recognizer can replace face information and text information with blanked-out or otherwise obscured content, thereby effectively redacting the sensitive information in the video information.

The recognizer configuration module 404 (of FIG. 4) dynamically configures the recognition system 602 based on the current demands for objects imposed by the active applications. Hence, when an application becomes active, or an application becomes inactive, the recognizer configuration module 404 can dynamically modify the data flow graph, e.g., by adding nodes to it or pruning nodes from it. To do so, the recognizer configuration module 404 consults stored information which identifies the input sources and output sinks associated with each recognizer.

Figure 7:
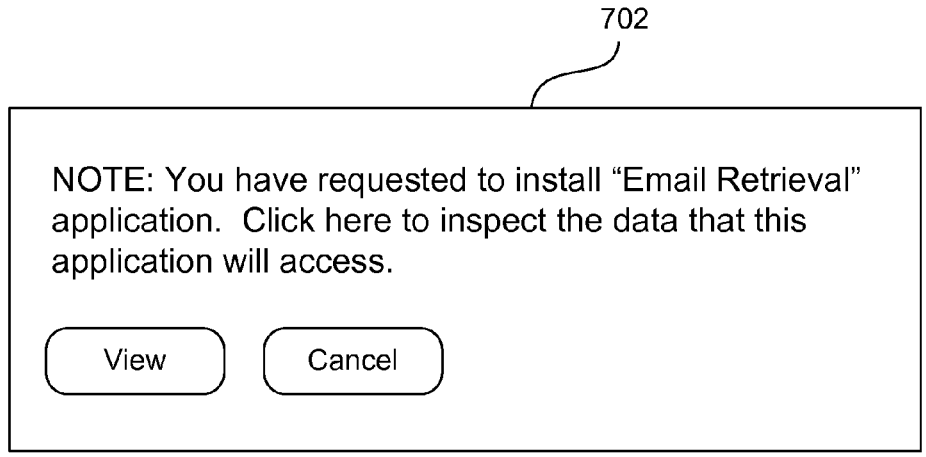
FIG. 7 shows one illustrative user interface presentation that may be presented by a visualization module. The visualization module is a component of the management module of FIG. 4.
Figure 8:
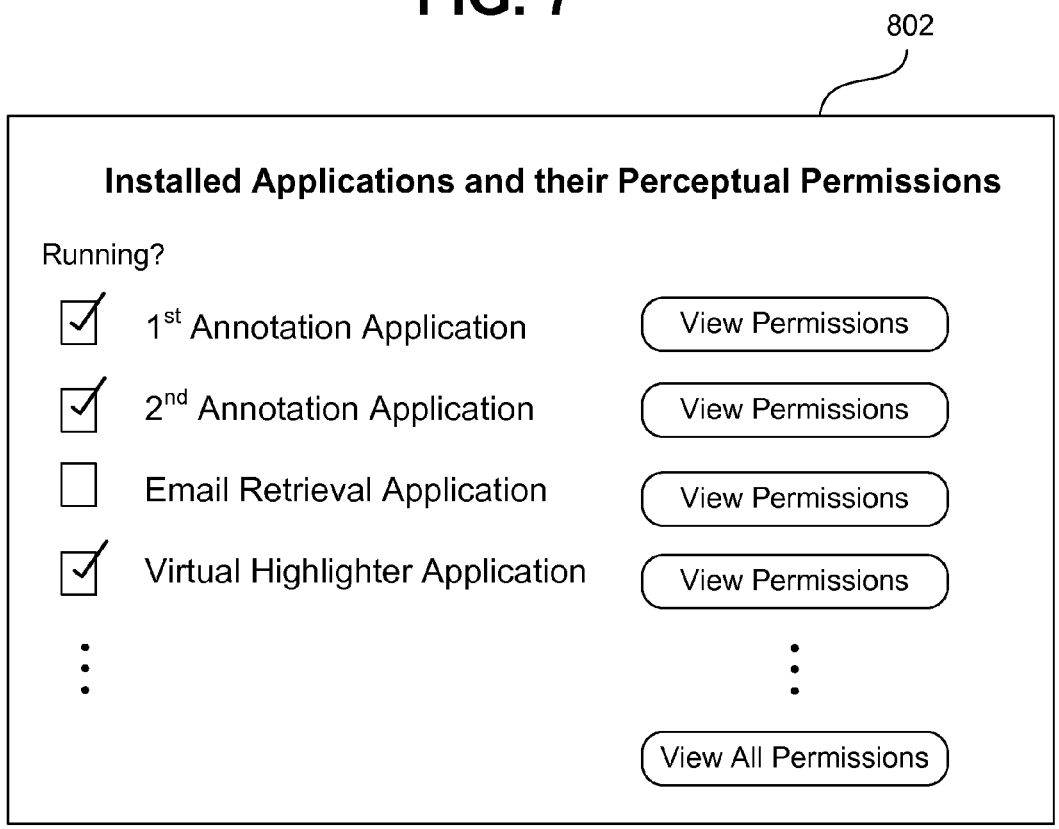
FIG. 8 shows another illustrative user interface presentation that may be presented by the visualization module.
Figure 9:
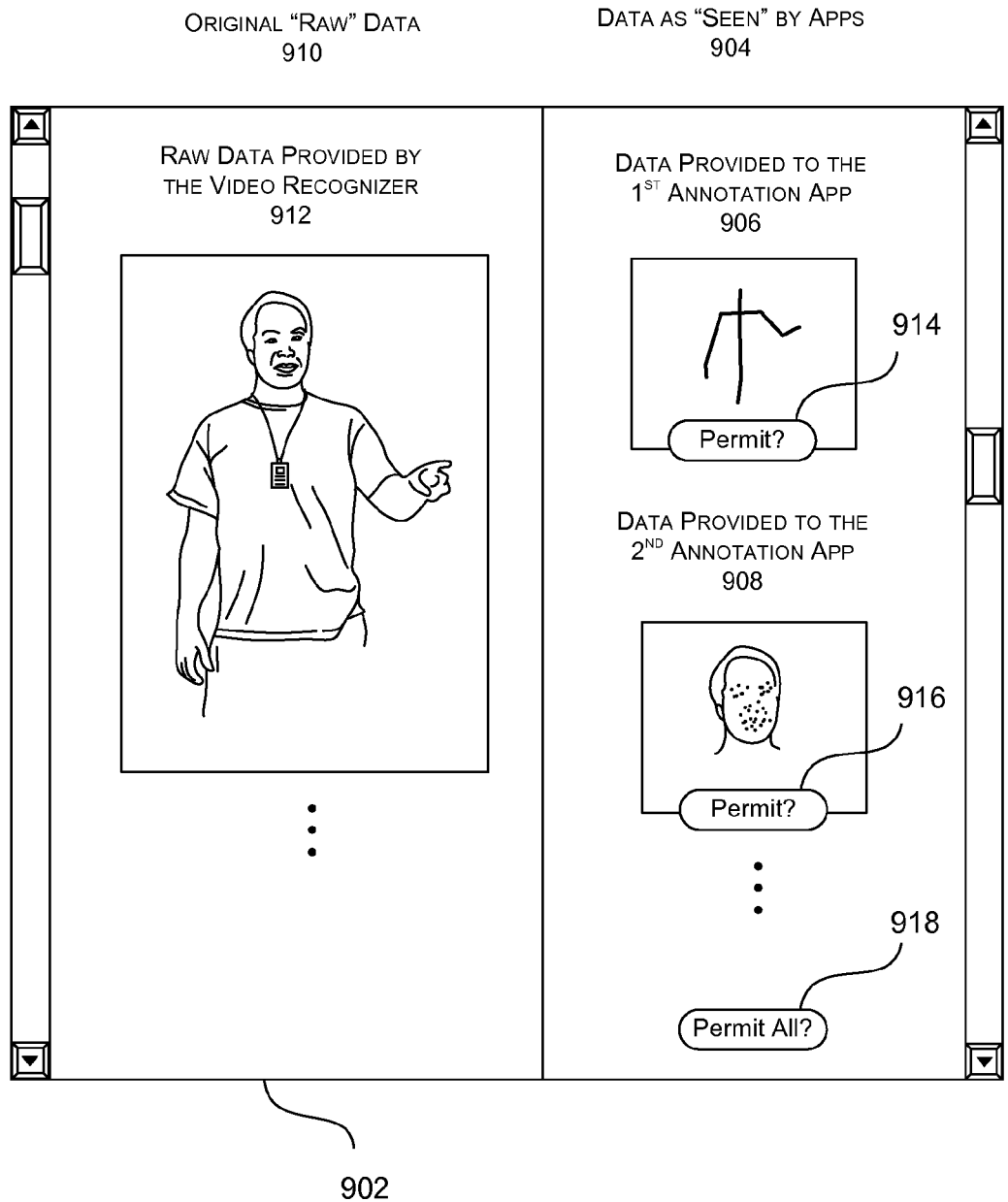
FIG. 9 shows another illustrative user interface presentation that may be presented by the visualization module. Here, the presentation reveals the objects that an application may attempt to access during its execution.

FIGS. 7-9 shows user interface presentations that may be generated by the privacy visualization module ("visualization module") 408 of FIG. 4. To begin with, FIG. 7 shows a user interface presentation 702 that the visualization module 408 may present when the user attempts to install a new application. The user interface presentation 702 invites the user to inspect the access rights being requested by the application. That is, if the user activates a "View" command, then the visualization module 408 will display the user interface presentation 902 shown in FIG. 9, to be described below. In an alternative implementation, the visualization module 408 automatically displays the user interface presentation 902 shown in FIG. 9 when a new application is installed or otherwise executed.

In contrast, FIG. 8 shows a user interface presentation 802 that invites the user to inspect the access rights associated with any application that has already been installed, e.g., by clicking the "View Permissions" command associated with this application, or by clicking the "View all Permissions" command (to view the permissions granted by all installed applications, or all currently running applications). These actions will again cause the visualization module 408 to display the user interface presentation 902 shown in FIG. 9.

The visualization module 408 can invoke the user interface presentation 902 shown in FIG. 9 in yet other circumstances, based on other triggering events. For instance, the visualization module 408 can also display the user interface presentation shown 902 during the running of the application, e.g., in a utility-type panel in the margin of the application's display presentation or the like.

Advancing to FIG. 9, a first part 904 of the user interface presentation 902 may provide a visual representation of the objects to which each application requests access (or already has access). For example, assume that the applications in question request access to skeleton events provided by the skeleton recognizer 630 and face events provided by the face detector recognizer 626. The user interface presentation 902 may devote a first display region 906 for providing a visualization of the skeleton information expressed by the skeleton events, and a second display region 908 for showing a visualization of the face information expressed by the face events. Alternatively, the first part 904 can provide a single visualization that shows access rights of two or more applications, rather than showing separate regions for respective applications.

The user interface presentation 902 can optionally include a second part 910 which displays a visualization of the raw data extracted by the sensing mechanisms. For example, the user interface presentation 902 can include a third region 912 that shows the raw video information provided by the video cameras 616, etc.

The first part 904 of the user interface presentation 902 may also include a command associated with each object request. This command invites the user to selectively permit the identified application to access the identified object. For example, the region 906 includes a "Permit" command 914 which enables the first annotation application 604 to receive skeleton events, and a "Permit" command 916 which enables the second annotation application 606 to receive face events. Alternatively, or in addition, a global permit command 918 may allow a user to authorize all applications to receive their designated requested objects.

The visualization module 408 can present the visualizations shown in FIG. 9 in any manner. In one case, the visualization module 408 relies on archived stock images and/or video snippets to show the access privileges associated with a particular application. These stock examples may have no relation to the entities within the real world 102 that are being observed at the current time. In another case, the visualization module 408 can display the actual output information generated by the recognizers, with respect to whatever scene is being captured by the reality-sensing framework 202 at the present time. But in this later implementation, the management module 224 can prevent the events from actually being delivered to the application(s) if the user has not yet permitted this delivery.

In one implementation, the visualization module 408 can handle all aspects of the visualization tasks described above. In another implementation, the visualization module 408 can make calls to visualization functions provided by respective recognizers. The recognizers can respond to the calls by returning display information. The visualization module 408 then presents the forwarded display information in the user interface presentation 902. Alternatively, the recognizers can directly provide information to the user interface presentation 902 without the mediation of the visualization module 408. Still other implementations are possible.

The permission management module 406 stores permission information based on the selections made by the user via the user interface presentation 902. The event handling module 412 then references that permission information in deciding what events that it is permitted to send to the applications 204 running at a particular time.

Figure 10:
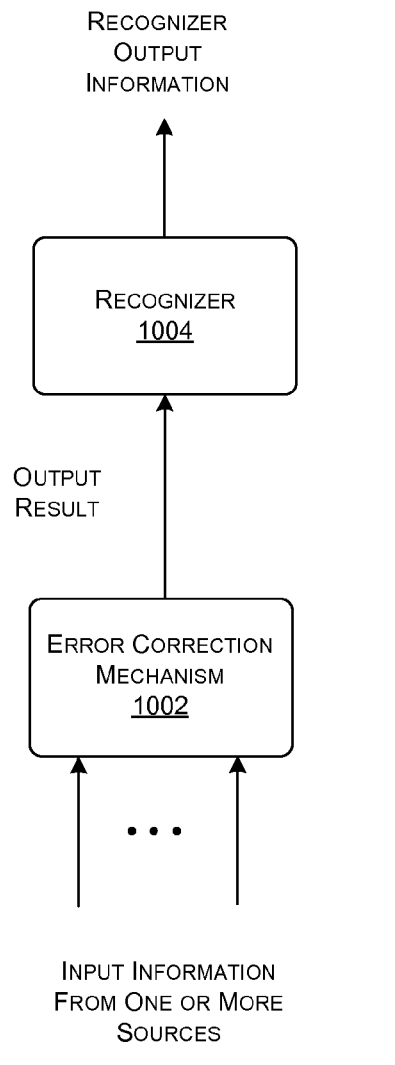
FIG. 10 shows one illustrative error correction mechanism, in conjunction with an associated recognizer. The error correction mechanism is designed to reduce the incidence of false positives generated by the recognizer.

FIG. 10 shows one illustrative error correction mechanism 1002 that works in conjunction with a particular recognizer 1004. In this configuration, the error correction mechanism 1002 receives input information from one or more sources, such as events from one or more source recognizers. The error correction mechanism 1002 processes the input information in a prescribed manner to provide an output result. The recognizer 1004 uses the output result to reduce the incidence of false positives in the output information generated by the recognizer 1004.

More generally, FIG. 10 shows that the recognizer 1004 receives the output result generated by the error correction mechanism 1002 as one of its inputs. But in other cases, the error correction mechanism 1002 can act on the output events generated by the recognizer 1004, or the error correction mechanism 1002 can play some role in the internal processing performed by the recognizer 1004, or any combination thereof. In general, it may be said that the error correction mechanism 1002 and the recognizer 1004 work in conjunction, in any manner, to reduce the incidence of false positives generated by the recognizer 1004.

Consider two particular and non-limiting instantiations of the functionality shown in FIG. 10. In a first implementation, the error correction mechanism 1002 receives video or image input information from one or more source recognizers, such as the video recognizer 622 of FIG. 6. The error correction mechanism 1002 then blurs the input information using any type of blurring filter (such as a box filter), to generated blurred output information. The recognizer 1004 receives the blurred output information as an input, and operates on this blurred information to generate its output events. By burring the input information to the recognizer 1004, the recognizer 1004 is less likely to incorrectly identify an entity within the input information as a specified object (such as a face), e.g., because the blurring may reduce the similarity between the entity being analyzed and the object of interest being sought (such as a face).

In a second implementation, the error correction mechanism 1002 compares a current frame of image information with one or more previous frames of image information. Or the error correction mechanism 1002 can compare a region in the current frame of image information with a counterpart region in one or more previous frames of image information. For example, the error correction mechanism 1002 can form the difference between counterpart pixels in the current frame and the immediately previous frame, sum these differences, and then compare the resultant sum with a threshold to determine whether the two frames are substantially the same or different. In another implementation, the error correction mechanism 1002 can form a measure which reflects the difference between the current frame and two or more previous frames, such as by forming a pairwise comparison between the current frame and each previous frame to generate an individual difference measure, and then generating an average of the individual difference measures. The recognizer 1004 then processes the current frame to determine whether it contains a specified object, such as face data, etc. However, the recognizer 1004 can reject a conclusion that the current frame contains the specified object if: (1) no object was detected in the previous frame(s); and (2) the current frame and the previous frame(s) are substantially the same (based on the output result of the error correction mechanism 1002). More generally, the above-described operations may be distributed between the error correction mechanism 1002 and the recognizer 1004 in any manner.

Figure 11:
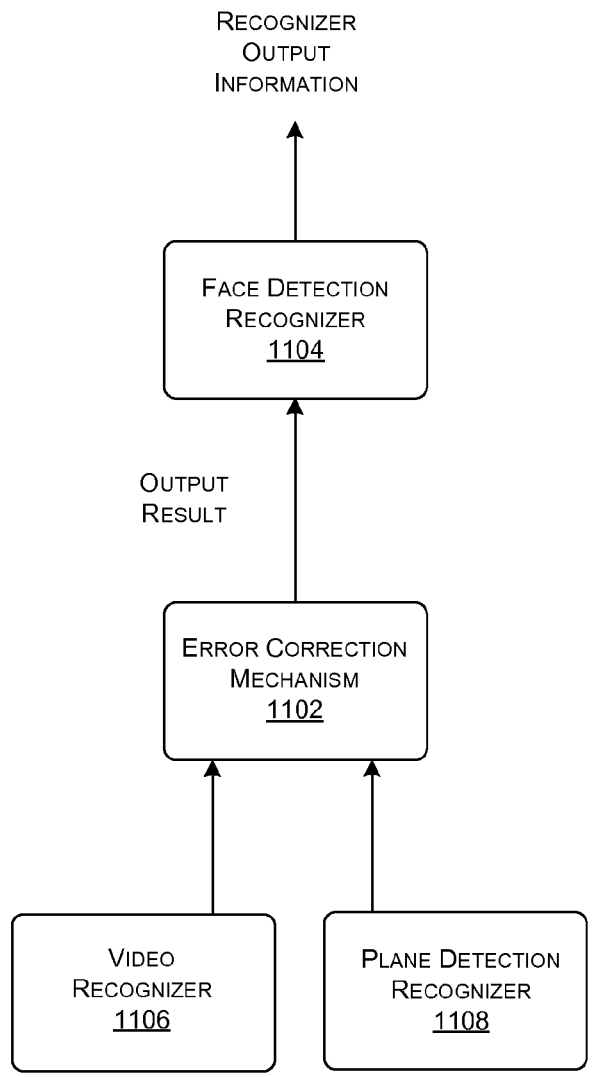
FIG. 11 shows another illustrative error correction mechanism, together with its associated recognizer.

FIG. 11 shows another error correction mechanism 1102 that works in association with a face detection recognizer 1104. The error correction mechanism 1102 receives video information from at least a video recognizer 1106 and depth information from a plane detection recognizer 1108. The error correction mechanism 1102 can use the depth information to blank out or otherwise obscure all video information that originates before an identified plane in the scene or after the identified plane in the scene, with respect to an identified reference point (e.g., the position of the video camera). The face detection recognizer 1104 accepts this redacted image information as an input. The recognizer 1104 will be precluded from identifying face content before or after the identified plane because the face content has been removed from these regions. This provision, for example, can help remove the faces of bystanders who may be inadvertently captured in the video information provided by the video cameras.

The error correction mechanism 1102 shown in FIG. 11 may alternatively correspond to a component within the face detection recognizer 1104 itself. In that setup, the error correction mechanism 1102 rejects an indication that video information contains a face if that video information originates before or behind a designated plane in a depth image.

Broadly stated, the error correction mechanism 1102 and/or the recognizer 1104 can operate by using the output information generated by a first source recognizer (e.g., the plane detection recognizer 1108) to designate a region within the output information generated by a second source recognizer (e.g., the video recognizer 1106), or otherwise qualify the analysis of the output information provided by the second source recognizer.

In another application of the functionality of FIG. 11, the error correction mechanism 1102 can receive information from a face detector, which indicates the presence (or absence) of a face in the scene. The error correction mechanism 1102 can then blank out all portions of video information which do not correspond to faces. An eye recognizer receives the redacted output information generated by the error correction mechanism 1102, and then analyzes this information to determine the positions and orientations of the eyes in the scene. By virtue of the fact that the input information that is fed to this recognizer contains only face-related video information, the recognizer can reduce the likelihood that it will falsely interpret an entity in the scene as an eye, when, in fact, it is not an eye.

In general, any error correction mechanism can be implemented as a component that is independent of, and agnostic with respect to, the operation of the recognizer to which it is coupled. And as explained above, the error correction mechanism can be coupled to its recognizer in various ways, such as by conditioning the input that is fed to the recognizer, modifying the output that is provided by the recognizer, and/or affecting the internal processing that is performed within the recognizer. By virtue of its independence from its recognizer, an error correction mechanism can be coupled to any recognizer of a particular class, without regard to the particular manner in which the recognizer is designed. In another implementation, a custom (recognizer-specific) error correction mechanism can be designed for use with respect to one or more particular recognizers.

A.3. The Shared Renderer

Figure 12:
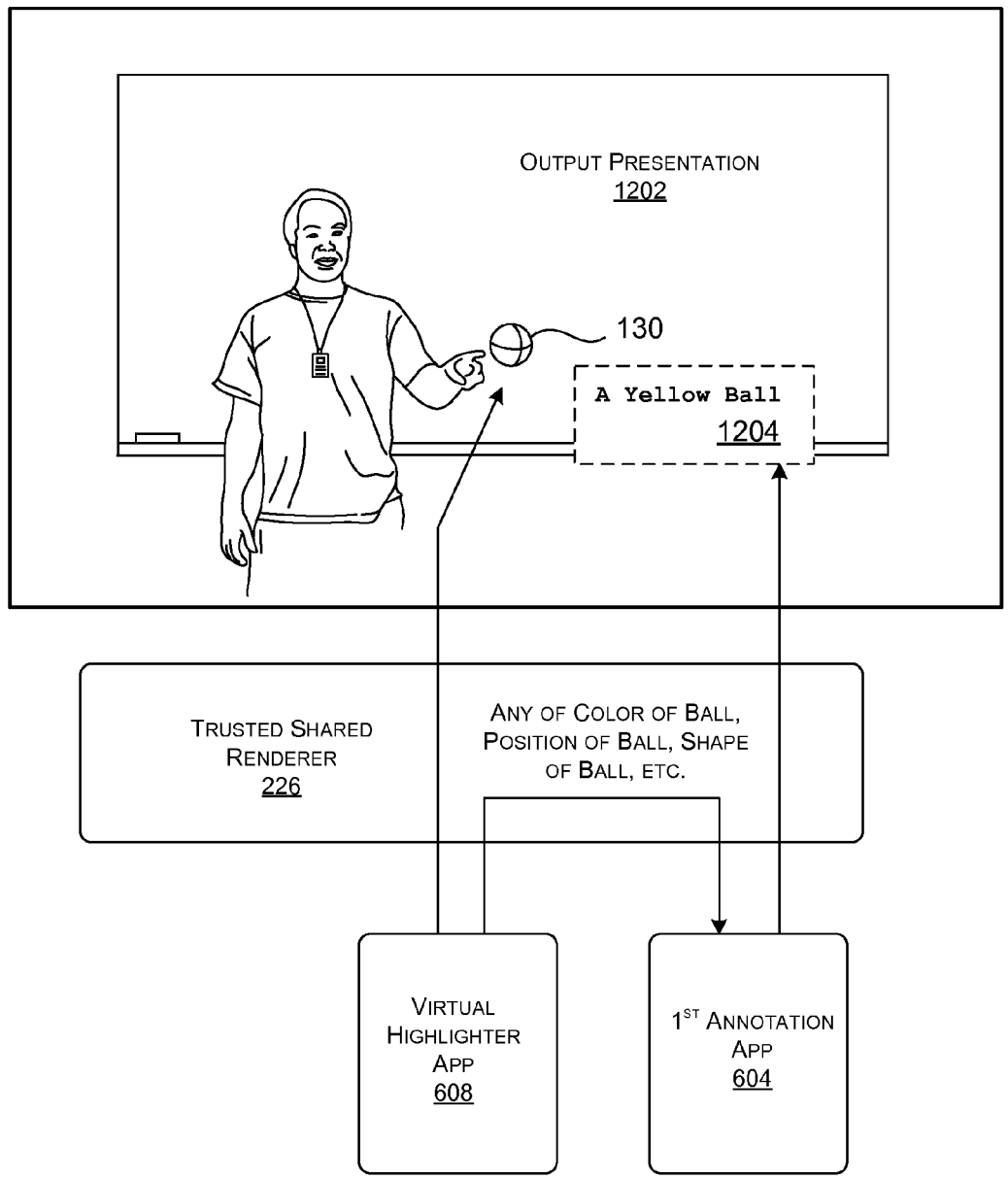
FIG. 12 shows an illustrative scenario in which one augmented reality application may share information with another augmented reality application via a shared render.

Before delving into the illustrative specifics of the shared renderer 226, consider a specific illustrative scenario, depicted in FIG. 12, in which one application may share information with another application via the shared renderer 226. The first application corresponds to the virtual highlighter application 608, which determines the position of a person's hands, and then displays a virtual object, such as a virtual ball 130, on an output presentation 1202, in proximity to one of the person's hands. The second application corresponds to the first annotation application 604 which displays labels based on skeleton events provided by the skeleton recognizer 630.

In addition to annotating parts of the sensed scene, the first annotation application 604 can receive information from the virtual highlighter application 608 which describes various properties of the virtual ball 130, such as the position, color, shape, etc. of the virtual ball 130. The first annotation application 604 can then present a label 1204 on the output presentation 1202 which describes the virtual ball 130, as in the illustrative description, "A Yellow Ball." To allow this information sharing to occur, the virtual highlighter application 608 has, in a preliminary operation, granted the first annotation application 604 the authority to read information regarding the virtual ball 130.

Figure 13:
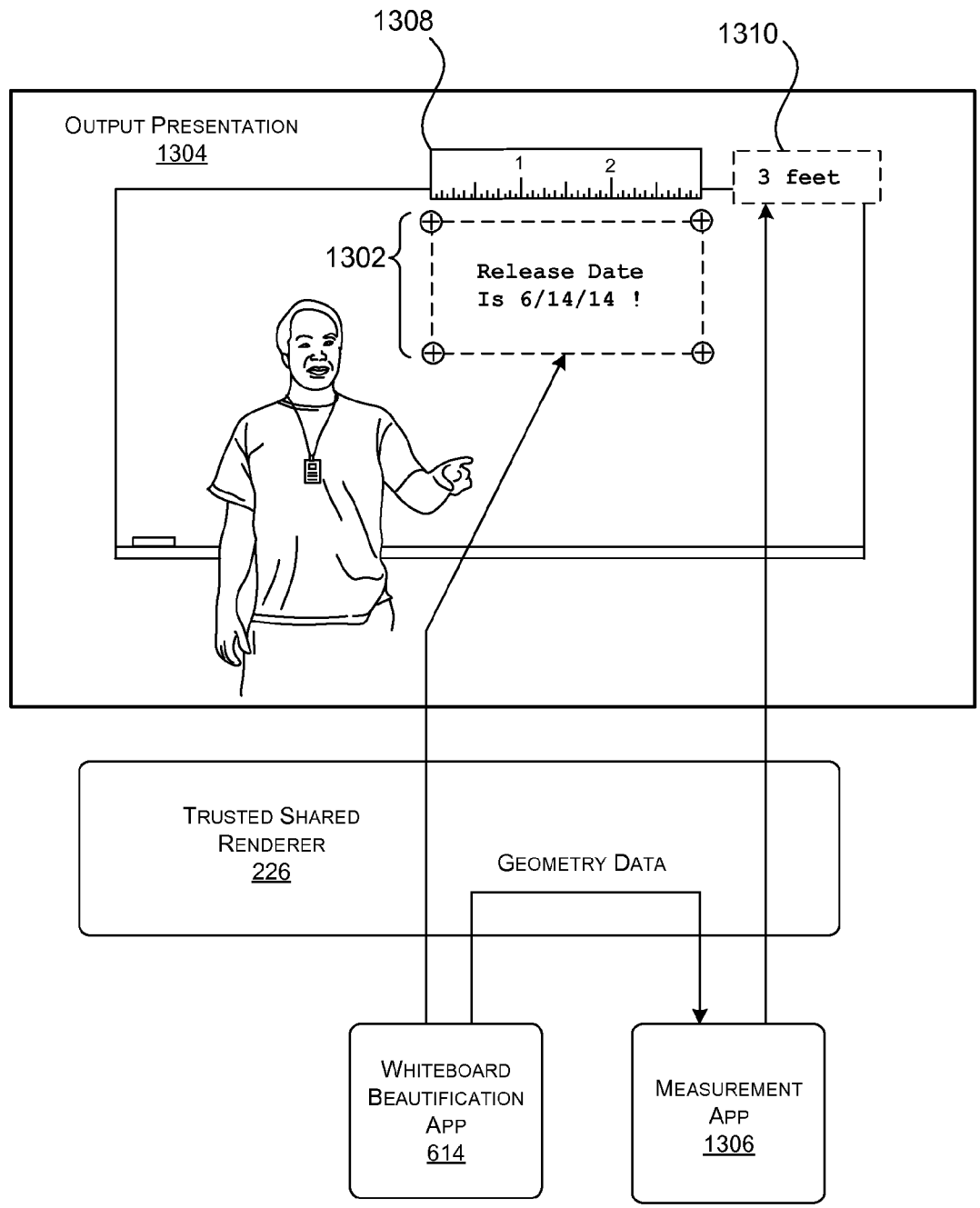
FIG. 13 shows another illustrative scenario in which one augmented reality application may share information with another augmented reality application via the shared renderer.

FIG. 13 shows another example of inter-application sharing via the shared renderer 226. Here, the first application is the beautification application 614, which operates to read the writing 114 on the whiteboard 106, beautify it, and display counterpart beautified writing 1302 on an output presentation

1304. A second application is a measurement application 1306 which measures the dimensions of objects, or measures the distances between two identified objects in the output presentation 1304. The distances may correlate to actual distances within the real world 102.

For example, in the scenario of FIG. 13, the user has instructed the measurement application 1306 to measure the horizontal span of the beautified writing 1302. In response, the measurement application 1306 can provide a visual ruler indicator 1308 to indicate the horizontal span of beautified writing 1302 that is being measured, together with an output label 1310 which indicates the resultant measurement (e.g., "3 feet" in this case). To perform the above functions, in a preliminary operation, the beautification application 614 grants the measurement application 1306 the right to read geometry data associated with objects generated and displayed by the beautification application 614. In another case, the measurement application 1306 can determine the distance between two objects produced by two respective applications when those two applications separately grant the measurement application rights to access their geometry data.

In addition, a first application can give a second application the authority to write information regarding an identified object property to the first application. For example, the label 1204 shown in FIG. 12, generated by the first annotation application 604, has a position. The first annotation application can authorize the virtual highlighter application 608 the authority to write position information to the first annotation application 604 that pertains to the position of the virtual ball 130, which the first annotation application 604 then uses to define the position of the label 1204.

Figure 14:
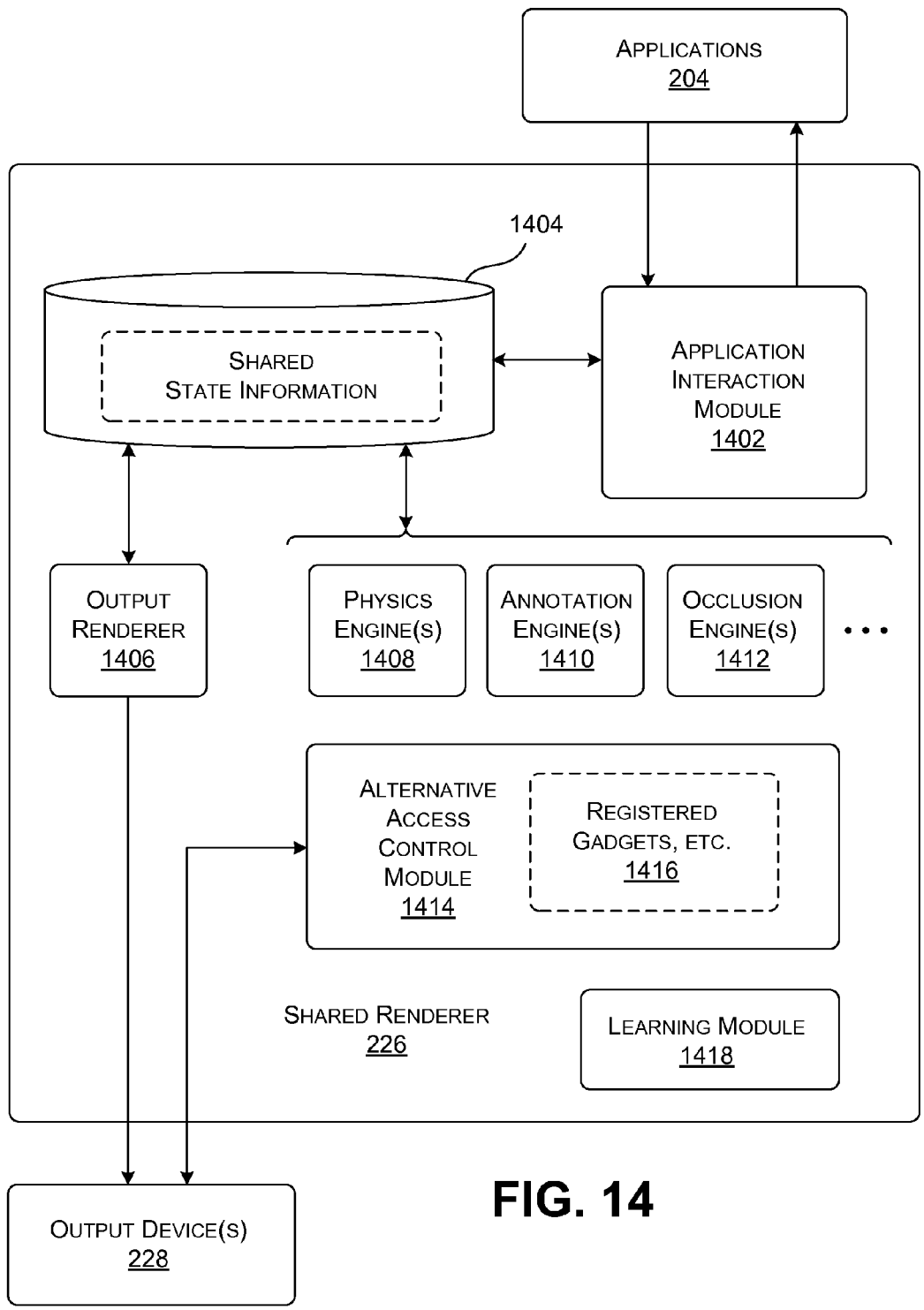
FIG. 14 shows one illustrative implementation of the shared renderer that may deliver the experiences of FIGS. 12 and 13.

FIG. 14 shows one illustrative implementation of the shared renderer 226 that may deliver the experiences of FIGS. 12 and 13. The shared renderer 226 includes various components that perform different respective functions. For example, the shared renderer 226 includes an application interaction module 1402 for interacting with one or more applications 204. For example, the application interaction module 1402 receives information regarding objects created (and later destroyed) by each application, as well as the properties of those objects.

The application interaction module 1402 may also receive permission information from the applications 204. An instance of the permission information establishes a set of zero, one or more permissions regarding a particular object property. An application, referred to as the permission-setting or controlling application, may issue such an instance of the permission information if it "owns" the object to which the property pertains, or otherwise has authority with respect to that object property for the access mode (read or write) under consideration. The permission information identifies the other applications which are entitled to receive or provide information regarding the particular object property. An application which supplies information regarding a particular object property is referred to as a sharer application.

For example, with respect to FIG. 12, one object property that is controlled by the virtual highlighter application 608 corresponds to the position of the virtual ball 130. The virtual highlighter application 608 can set permission information which indicates that the first annotation application 604 is permitted to read the position of the virtual ball 130. In another case, the first annotation application 604 can set permission information which authorizes the virtual highlighter application 608 to write position data, corresponding to the position of the virtual ball 130, to the first annotation application 604, which the first annotation application 604 subsequently uses to define the position of the label 1204. In both cases, the virtual highlighter application 608 is the sharer application.

The application interaction module 1402 stores all information regarding objects, object properties, and permission information, in a data store 1404. That information collectively constitutes shared state information. That is, the shared state information reflects the shared output space to which all of the applications 204 contribute. The shared output space may represent these objects in any number of dimensions, such as two dimensions, three dimensions, and so on. For example, the reality-sensing framework 202 can create objects having three dimensions by virtue of its receipt and processing of depth information provided by one or more depth capture mechanisms.

The application interaction module 1402 may manage inter-application sharing in the following illustrative manner. First, the application interaction module 1402 detects if an update has occurred that affects any object property in the shared state information. For example, an application may provide an update by creating a new object property, a new value for an object property, a new instance of permission information, and so on. Or an internal engine of the shared renderer 226 may provide an update, e.g., as when a physics engine moves an object. The application interaction module 1402 can then determine whether the change is permitted. If so, the application interaction module 1402 can commit the change to the shared state information. The application interaction module 1402 can then consult the permission information associated with the object property under consideration to determine what applications are entitled to receive information regarding the update. The application interaction module 1402 will then send information regarding the update to those identified applications.

An output renderer 1406 provides an output presentation to one or more output devices 228, based on the shared state information in the data store 1404. For example, the output renderer may generate the type of visual output presentations (1202, 1304) shown in FIGS. 12 and 13, respectively.

One or more engines may also manipulate objects in the shared state information based on instructions from the applications 204 and/or other considerations. For example, a physics engine 1408 can dynamically manipulate any object in the shared state information to simulate real-life motion dynamics and/or other real-life phenomena. Alternatively, or in addition, the physics engine 1408 can manipulate any object pursuant to fanciful dynamics which do not necessarily correlate with real-world interactions. Any physics engine can be used to perform this task, such as, but not limited to the Unity game engine produced by Unity Technologies of San Francisco, Calif.

More specifically, the physics engine 1408 can receive high-level instructions from an application, which define the type of movement that is being imparted to a particular object that is controlled by the application. The physics engine 1408 can then simulate the movement using a database of simulation primitives. Note, however, that the physics engine 1408 operates to simulate the movement of objects within an output space produced by plural applications, not necessarily a single application. Hence, the physics engine 1408 is tasked with the responsibility of managing the manner in which the objects of one application may interfere with the objects of another, such as by managing the collision of an object produced by one application with an object produced by another application.

An annotation engine 1410 manages the presentation of annotations produced by plural applications, such as the first annotation application 604 and the second annotation application 606 described above. The annotation engine 1410 can use various principles and algorithms to perform this task. For example, the annotation engine 1410 can display each label within a prescribed distance of the object that it modifies within the output presentation. Further, the annotation engine 1410 can reduce clutter by limiting each application to displaying only a prescribed number of annotations. The annotation engine 1410 can apply yet other algorithms, such as various clutter-reduction strategies that take into account the nature of the scene depicted in the output presentation. One such clutter-reduction strategy can attempt to maximize the spatial separation between labels, subject to other constraints.

An occlusion engine 1412 provides various services to address the situation in which one object overlaps another in the output presentation, such as two labels, two virtual objects, a label and a virtual object, etc. A first service can operate to prevent or minimize the occurrence of occlusions, e.g., by moving one or more objects so that they no longer overlap. A second service can provide a visual indicator which alerts the user that two or more objects overlap. A third service may allow a user to manually change the positions and/or orientations of one or more objects, e.g., to reveal portions of an object that were previously occluded by another object. Still other occlusion-related services are possible.

As a point of clarification, in some cases, the above-described engines (1408, 1410, 1412) are able to modify the positions or other properties of objects that compose the shared state information. But the shared state information also includes a subset of objects which directly correlate to entities and events which occur in the real world 102. For example, one such object may correspond to face-redacted version of a real human being, or writing-redacted version of a real whiteboard. In one implementation, the various engines (1408, 1410, 1412) may not be permitted to modify the positions or other properties of objects which directly map to real world entities. In other implementations, this restriction may be relaxed or removed to various extents, insofar as the engines (1408, 1410, 1412) are capable of modifying an object which represents a real-life entity (which may not be the case in all implementations).

In one implementation, the applications 204 specify the permission information on a per-object-property basis, e.g., based on programmatic definitions in the code which implement the applications 204. The applications 204 then send information to the application interaction module 1402 which identifies the permissions information. In another case, an access control module 1414 implements one or more techniques by which an end user may manually specify permission information on a per-object-property basis and/or any other basis. In one case, the user may achieve this result by manipulating gadgets 1416 that appear within a user interface presentation. The ensuing description will provide examples of this mode of operation.

A learning module 1418 can receive feedback information regarding any aspect of the performance of the shared renderer 226. Based on this information, the learning module 1418 can modify the behavior of any component of the shared renderer 226. For example, any entity can provide feedback information regarding whether any component of the shared renderer 226 is performing a satisfactory service. Such feedback-providing entities can include any of an end user, an application, a shared renderer engine, etc. Based on this input, the learning module 1418 can modify the operation of one or more components of the shared renderer 226, with the objective of improving the performance of these components. For example, the user may indicate that the annotation engine 1410 is producing an output presentation that provides too many labels produced by a certain application. In response, the learning module 1418 can modify the annotation engine 1410 to decrease the number of annotations that the identified application is allotted within the output presentation.

Figure 15:
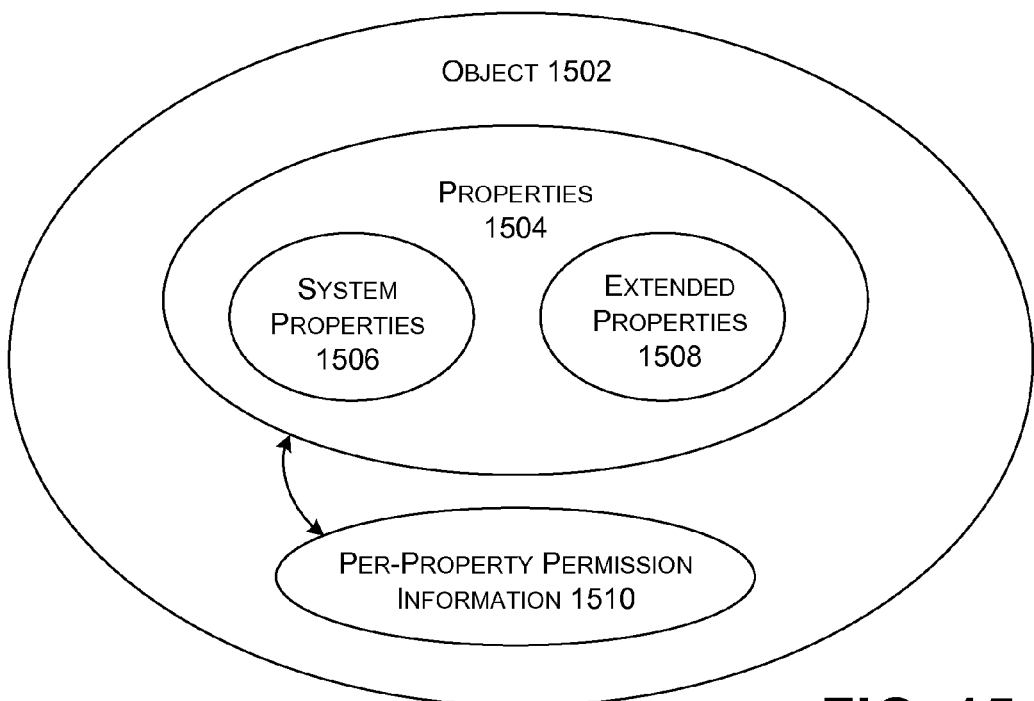
FIG. 15 is a diagram that identifies different types of information items that may compose shared state information, as maintained by the shared renderer.

FIG. 15 illustrates a taxonomy of features that may compose the shared state information. On a highest level, the shared state information includes a collection of objects provided by plural applications. One such object is object 1502. Each object has zero, one, or more properties 1504. One or more of these properties 1504 may correspond to system properties 1506, and one or more of these properties 1504 may correspond to extended properties 1508. A system property is a property which is defined by the shared renderer 226, independent of property definitions provided by the applications 204. An extended property is an application-specific property that is defined by at least one application, but is not independently defined by the shared renderer 226. The shared state information also includes permission information 1510 for each object property. In one case, a property is either a system property or an extended property, there being no other kind of property; in another case, an object can have one or more other kinds of properties.

Figure 16:
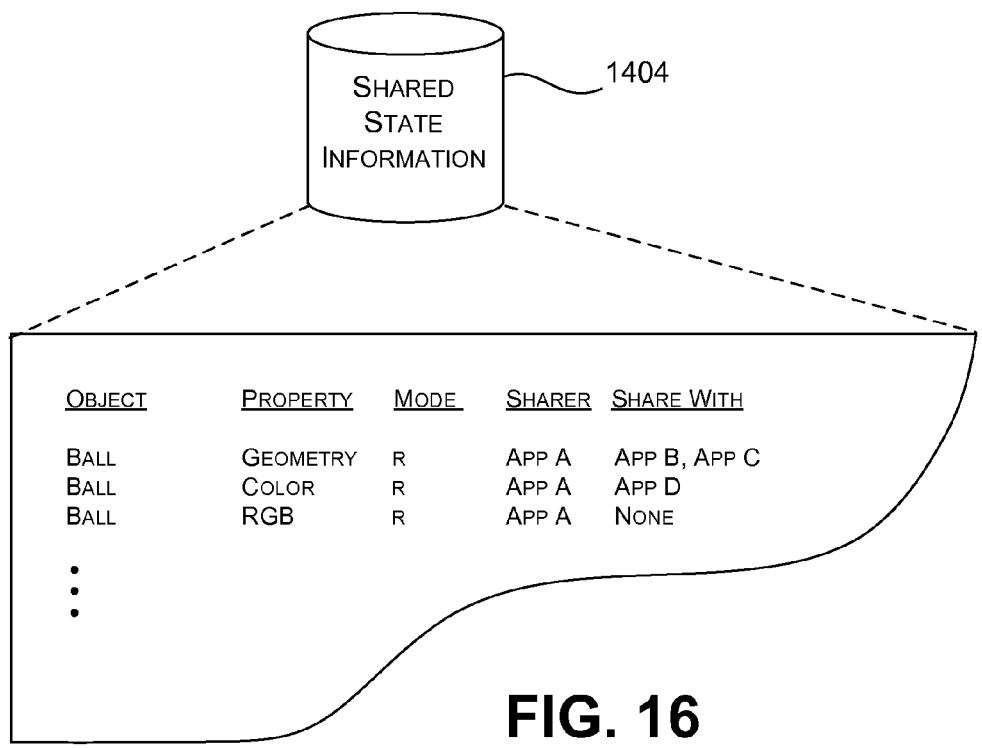
FIG. 16 shows one way of expressing permission information, which is part of the shared state information.

FIG. 16 shows permission information for a collection of object properties that may be stored in the data store 1404. Each instance of the property information identifies an object, a property of that object, the application which shares information about the object property, the applications with which the information may be shared, and the mode of sharing provided by the permission (e.g., read or write, etc.). For example, the first instance of permission information corresponds to geometry information regarding the virtual ball 130. The permission information indicates that the virtual ball 130 and its geometry property are created by application A (e.g., the virtual highlighter application 608), and that information regarding this property can be shared with applications B and C, in a read mode of interaction.

Figure 17:
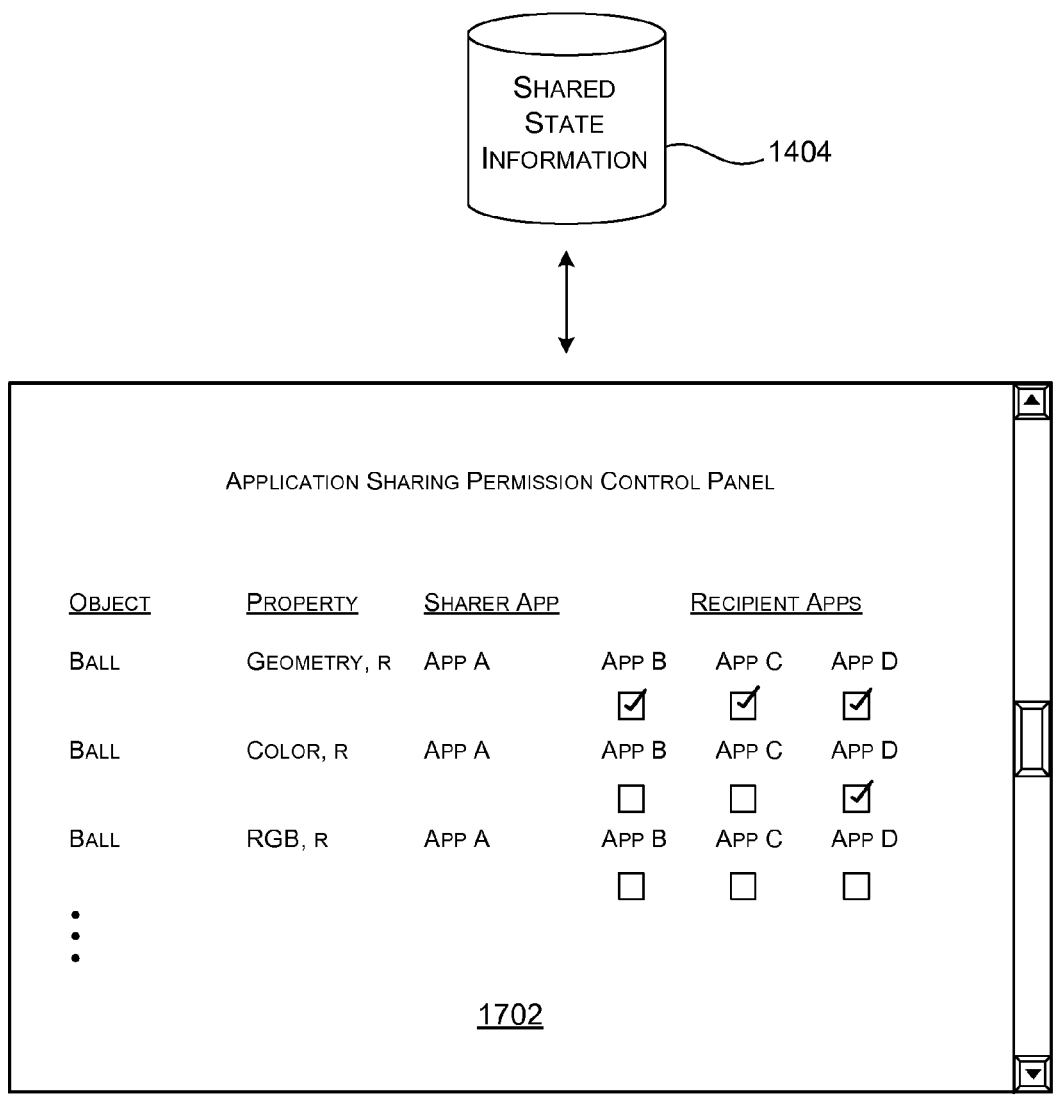
FIG. 17 shows one way by which a user may review and set the permission information.

FIG. 17 shows a user interface presentation 1702 by which the access control module 1414 can create permission information in response to interaction with an administrator, end user, or other person (instead of, or in addition to, receiving the permission information from the applications 204). As depicted there, the user interface presentation 1702 identifies a series of object properties. The user interface presentation 1702 invites the user to make selections, for each object property, which identify what applications are entitled to receive information regarding the object property, for a specified mode of interaction.

Figure 18:
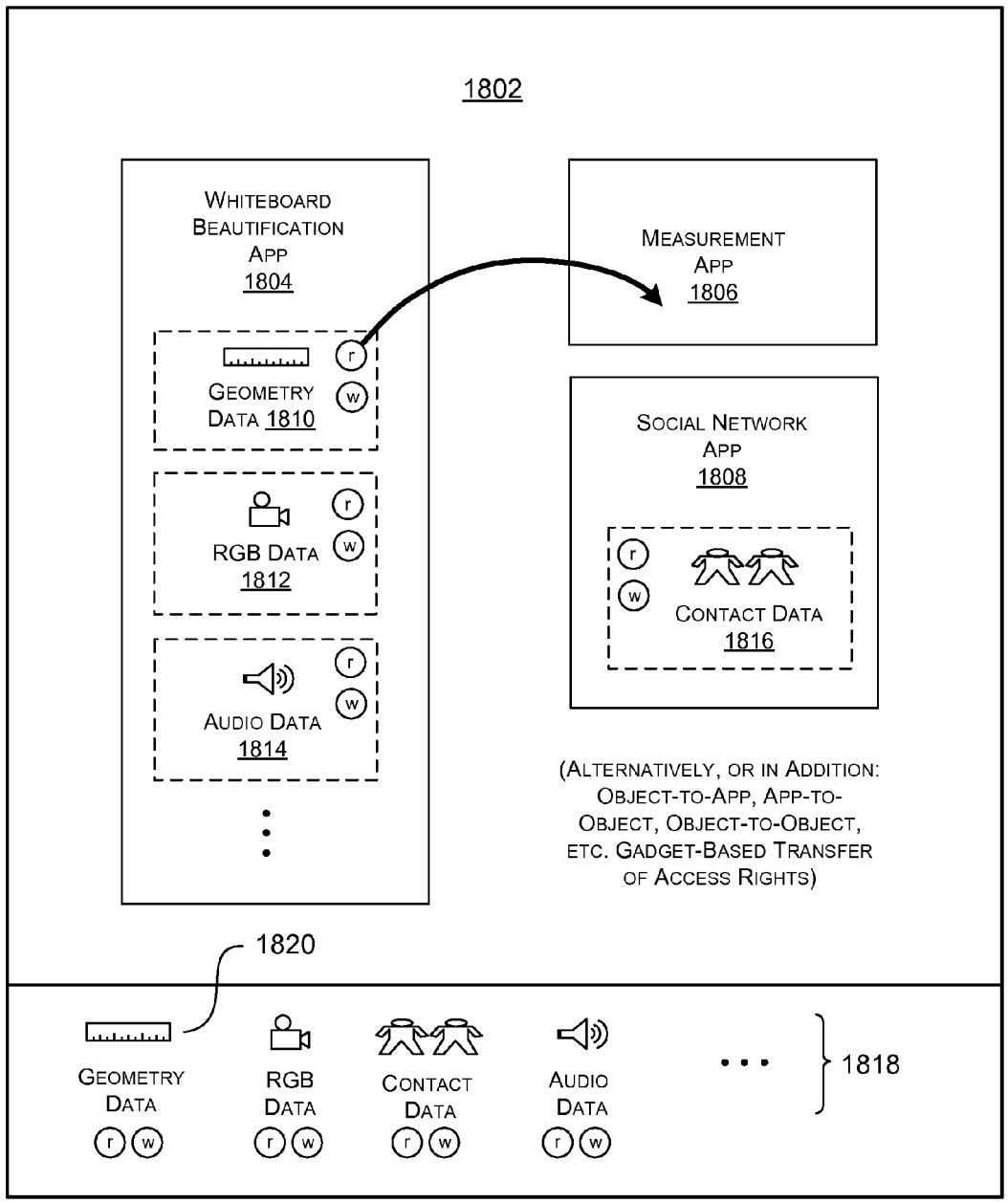
FIGS. 18 and 19 together show a way that a user may manually review and set permission information via the use of gadgets.

FIG. 18 shows another user interface presentation 1802 provided by the access control module 1414, by which the user can manually specify permission information. Here, the user interface presentation 1802 includes display items associated with different running applications, such as a whiteboard beautification app item 1804, a measurement app item 1806, and a social network app item 1808. Each item displays zero, one, or more gadgets that identify various object properties, together with a designation of one or more modes. For example, the whiteboard beautification app item 1804 includes a first gadget 1810 associated with geometry data, a second gadget 1812 associated with raw RGB data, and a third gadget 1814 associated with audio data. More specifically, these gadgets describe respective properties of any object created by the whiteboard beatification application 614. The social network app item 1808 includes a gadget 1816 associated with contact data.

In operation, a user can select any gadget, associated with any display item, and drag it over to another display item, e.g., using a mouse device, a touch gesture, or a free-space gesture, etc. This action has the effect of conferring an access right to the recipient application. For example, in the case of FIG. 18, the user has dragged the geometry data gadget 1810 of the whiteboard beautification app item 1804 over to the measurement app item 1806. In particular, the user has selected a read icon associated with the geometry data gadget 1810. This action has the effect of creating permission information which enables the measurement application to read geometry data for objects created by the whiteboard beautification application 614. Had the user performed the same movement with respect to the write icon, the permission information would give the measurement application the right to write geometry data to the whiteboard beautification application 614.

Figure 19:
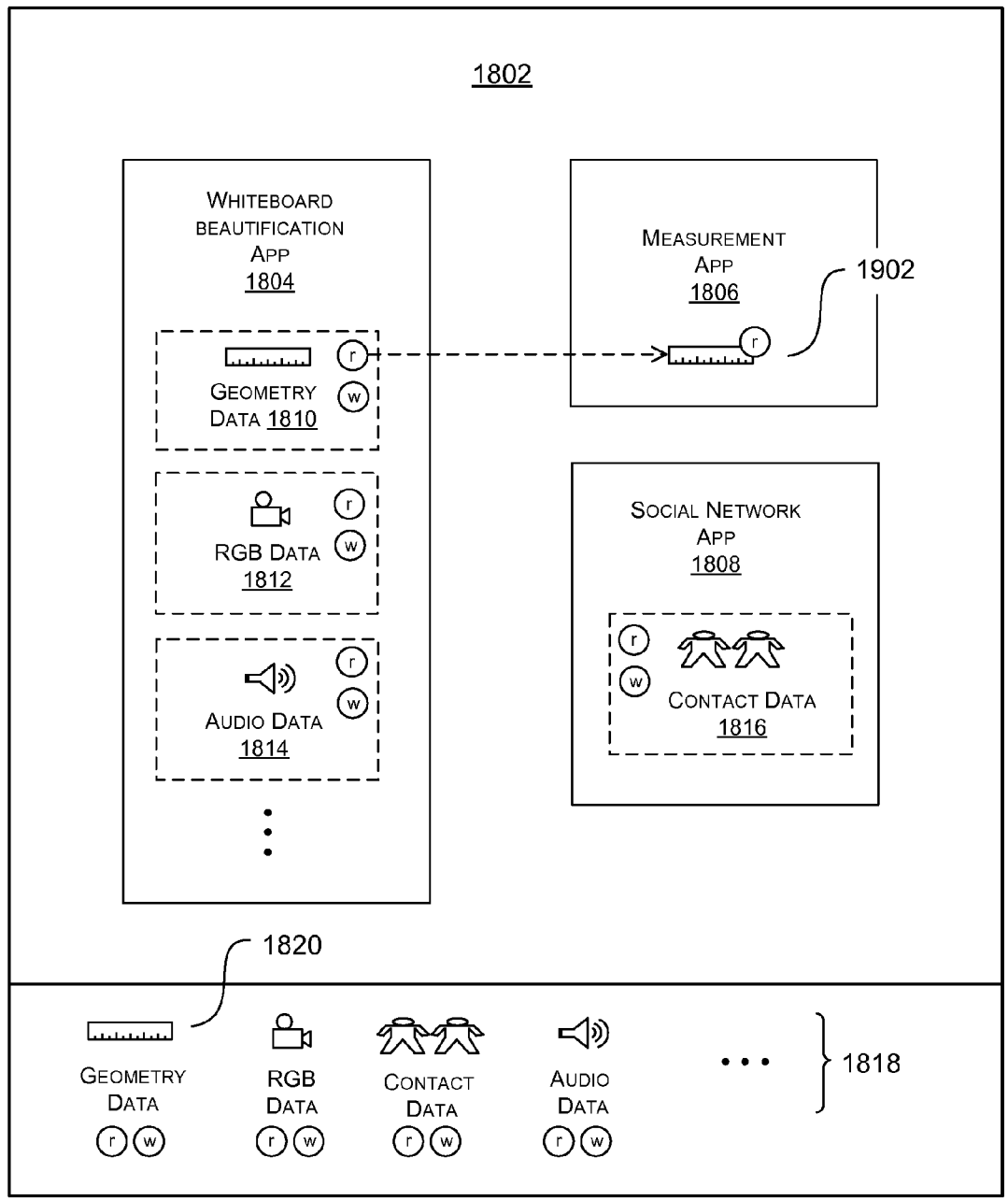

FIG. 19 shows the appearance of the user interface presentation 1802 following the user interaction shown in FIG. 18. The measurement app item 1806 now includes a gadget 1902 that indicates that it has been given the right to read geometry data associated with objects created by the whiteboard beautification application 614.

The above-described user interface functionality is cited by way of example, not limitation. Other user interface techniques can be used to achieve the same results described above, or to achieve other permission-granting effects. For example, the user interface presentation shown in FIGS. 18 and 19 can also include a bar of gadgets 1818. A user can drag any of these gadgets to a particular application's display item. Doing so gives the corresponding application certain rights with respect to all other applications, rather than a particular application (as in the example above). For example, the user can drag the geometry data gadget 1820 onto the measurement app item 1806, which gives the measurement application the right to read the geometry data of any object created by any other application (not just the whiteboard beautification application 614).

In another case, a user interface presentation can also present items associated with particular objects created by respective applications, together with a set of gadgets associated with each object. Each gadget corresponds to a particular property associated with the object under consideration. A user can then perform the above-described drag-and-drop operation to transfer access rights on a per-object basis. For example, a user can drag a gadget associated with a particular object to an application item, indicating that the recipient application now has access rights with respect to a particular object and a particular property. Or a user can drag a gadget associated with a first object (associated with a first application) to second object (associated with a second application). This action conveys object-to-object access rights. For example, with reference to the scenario of FIG. 12, a user can drag a position gadget associated with the virtual ball 130 to a label object associated with the label 1204, to indicate that the second application can only use the position of the ball to define the position of the label 1204.

Any application may create and register one or more gadgets for storage in the access control module 1414. For example, the whiteboard beautification application 614 can register the geometry data gadget 1810 in the access control module 1414.

In another case, the visual semantics of the drag-and-drop operation shown in FIGS. 18 and 19 can be reversed in the following manner. In the case of FIG. 18, for example, the measurement app item 1806 can have a gadget associated with geometry data, and designating a read mode of operation for this property. The user can drag this gadget to the whiteboard beautification app item 1804. This gives the measurement application that same rights as before, that is, the ability to read geometry data for any object produced by the whiteboard beautification application. Or the user can drag the geometry data gadget to a specific object produced by the whiteboard beautification application, such as a whiteboard object. This gives the measurement application the right to selectively read geometry data pertaining to the whiteboard object, but not other objects produced by the whiteboard beautification application. In a variation, the measurement application can register the geometry data gadget, whereupon it appears in the bar of gadgets 1818, with a tag which indicates that it pertains to the measurement application. The user can perform drag-and-drop operations using this geometry gadget in the same manner described above, to produce the same effect described above.

In summary, in the above alternative semantics, the application seeking a permission is the source of the drag-and-drop operation, rather than the target of the drag-and-drop operation. That is, the alternative semantics applies a requestor metaphor in which an application specifies the privileges it requests, as opposed to a grantor metaphor in which a privilege-conferring application grants a privilege to another application.

Figure 20:
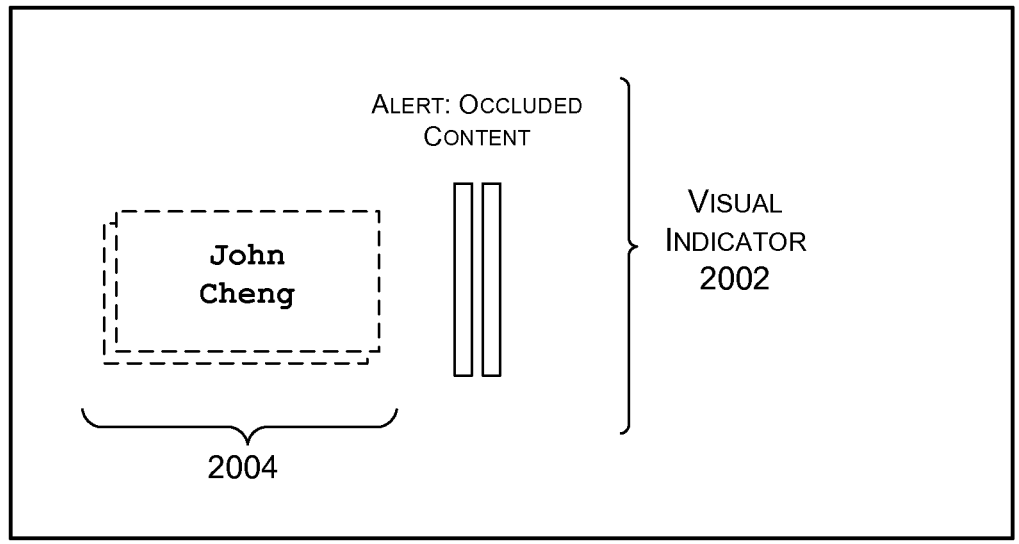
FIG. 20 shows a visual indicator that an occlusion engine may present to indicate that two or more objects overlap within an output presentation. The occlusion engine is a component of the shared renderer.

FIG. 20 shows an illustrative visual indicator 2002 that the occlusion engine 1412 may present to convey that two or more objects 2004 overlap, such as two or more annotations, or two or more virtual objects, etc. The appearance and behavior of this indicator 2002 can be varied in any manner. For example, the visual indicator may alternatively correspond to a highlight effect that is applied to the object 2004.

Figure 21:
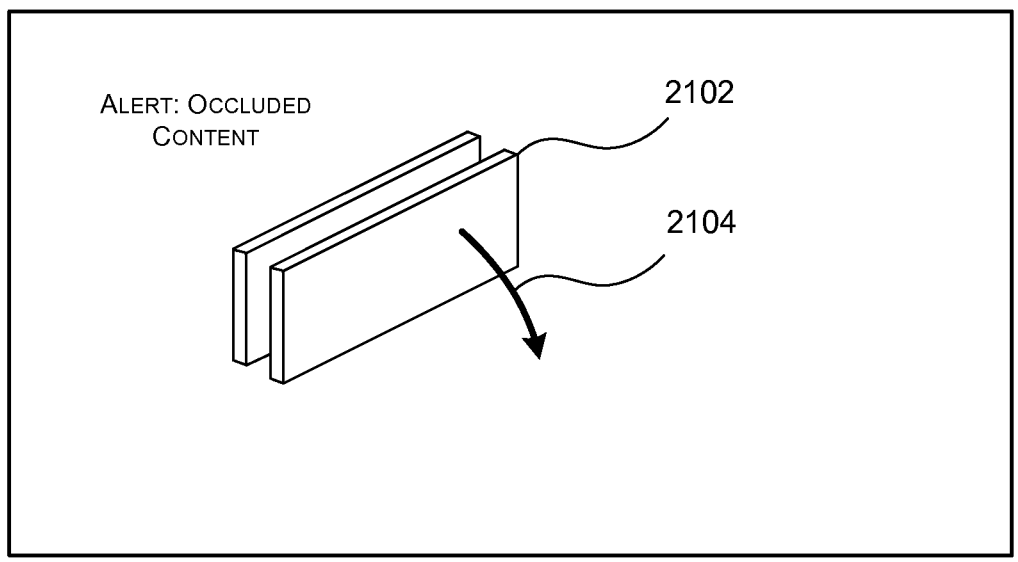
FIG. 21 shows the operation of a manipulation mechanism. A user may interact with the manipulation mechanism to gain a different perspective on overlapping objects.

FIG. 21 shows the operation of a manipulation mechanism that may be provided by the occlusion engine 1412, which allows the user to manually change the position and/or orientation of two or more overlapping objects 2102. In this case, the manipulation mechanism allows a user to select the overlapping objects and then rotate them about an axis, e.g., in the direction of arrow 2104. This movement reveals a different perspective on the overlapping objects, potentially revealing previously hidden information. The behavior of the manipulation mechanism can be varied in any manner.

B. Illustrative Processes

FIGS. 22-26 show procedures that explain one manner of operation of the reality-sensing framework 202 of FIG. 2. Since the principles underlying the operation of the reality-sensing framework 202 have already been described in Section A, certain operations will be addressed in summary fashion in this section.

Figure 22:
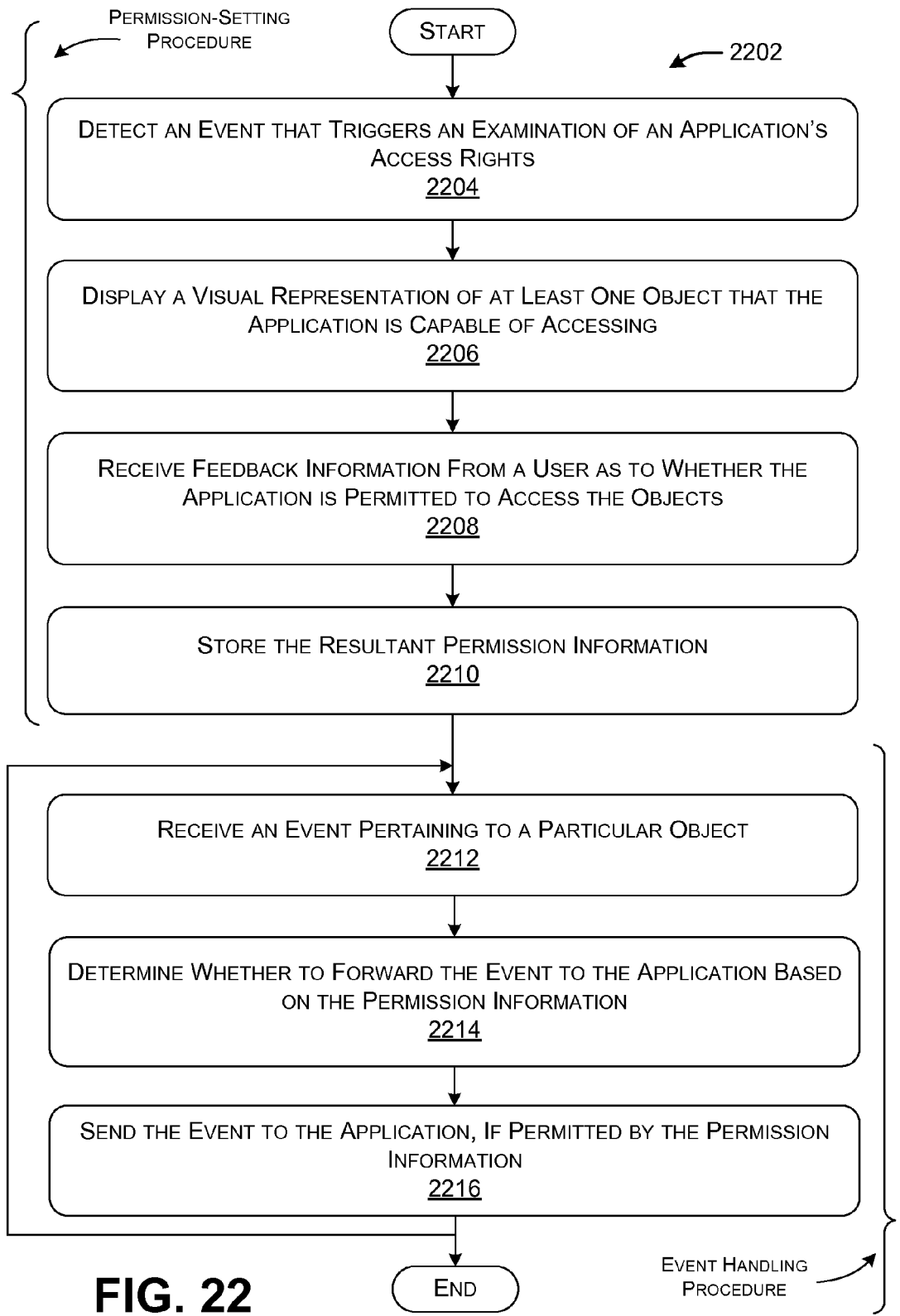
FIG. 22 is a flowchart that shows one manner of operation of the management module of FIG. 4.

Starting with FIG. 22, this figure shows a procedure 2202 that represents one manner of operation of the management module 224 of FIG. 4. In block 2204, the management module 224 detects an event that triggers an examination of an application's access rights. This event may correspond to a request to install or otherwise run the application, or a request to inspect the access rights of an application that has already been installed. In block 2206, the management module 224 displays a visual representation of the access rights that will be, or have been, conferred to the application. FIG. 9 shows one such visual representation of the access rights. In block 2208, the management module 224 receives feedback information from a user which indicates whether the application is permitted to access the identified objects. This feedback can be provided on a per-object basis, or globally, for all objects associated with an application. In block 2210, the management module 224 stores permission information that reflects the user's choices in block 2208. The operations in blocks 2204-2210 have been described with respect to a single application under investigation, but the same operations can be performed to define permission information for two or more applications that operate at the same time. In that case, the management module 224 can provide separate visualizations for the respective applications, or a single integrated visualization.

In block 2212, the management module 224 receives an event pertaining to a particular object from the recognition system 220. In block 2214, the management module 224 consults the permission information (created in blocks 2204-2210) to determine the application or applications that are permitted to receive the event. In block 2216, the management module 224 sends the event to the application or applications that are entitled to receive the event, as determined in block 2214.

Figure 23:
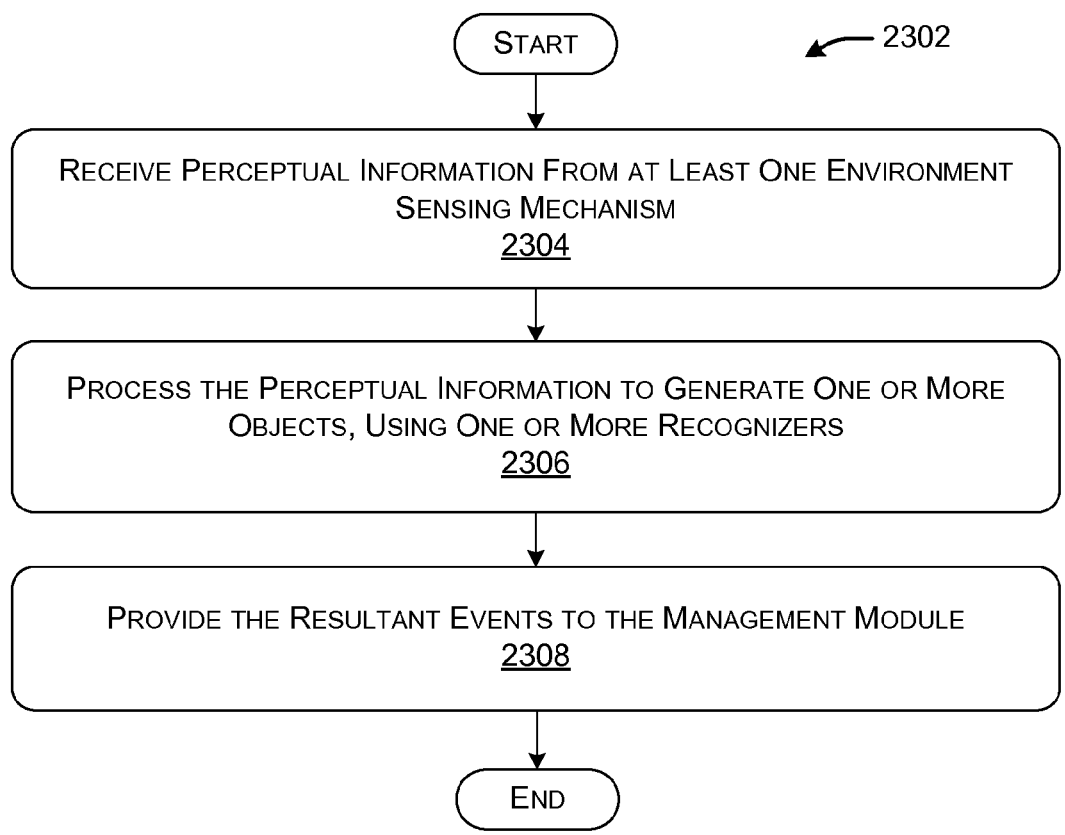
FIG. 23 is a flowchart that shows one manner of operation of the recognition system of FIG. 5.

FIG. 23 shows a procedure 2302 which provides an overview of one manner of operation of the recognition system 220. In block 2304, the recognition system 220 receives raw perceptual information from one or more sensing mechanisms 214. In block 2306, the recognition system 220 processes the perceptual information using one or more recognizers to generate one or more objects. Each recognizer expresses the objects that it has identified as an event. For example, the face detector recognizer 626 generates an event that includes a data structure containing data that describes a human subject's face. In block 2308, the recognition system 220 forwards its events to the management module 224 on a pull and/or push basis, which then passes selected events on to the authorized applications 204.

Figure 24:
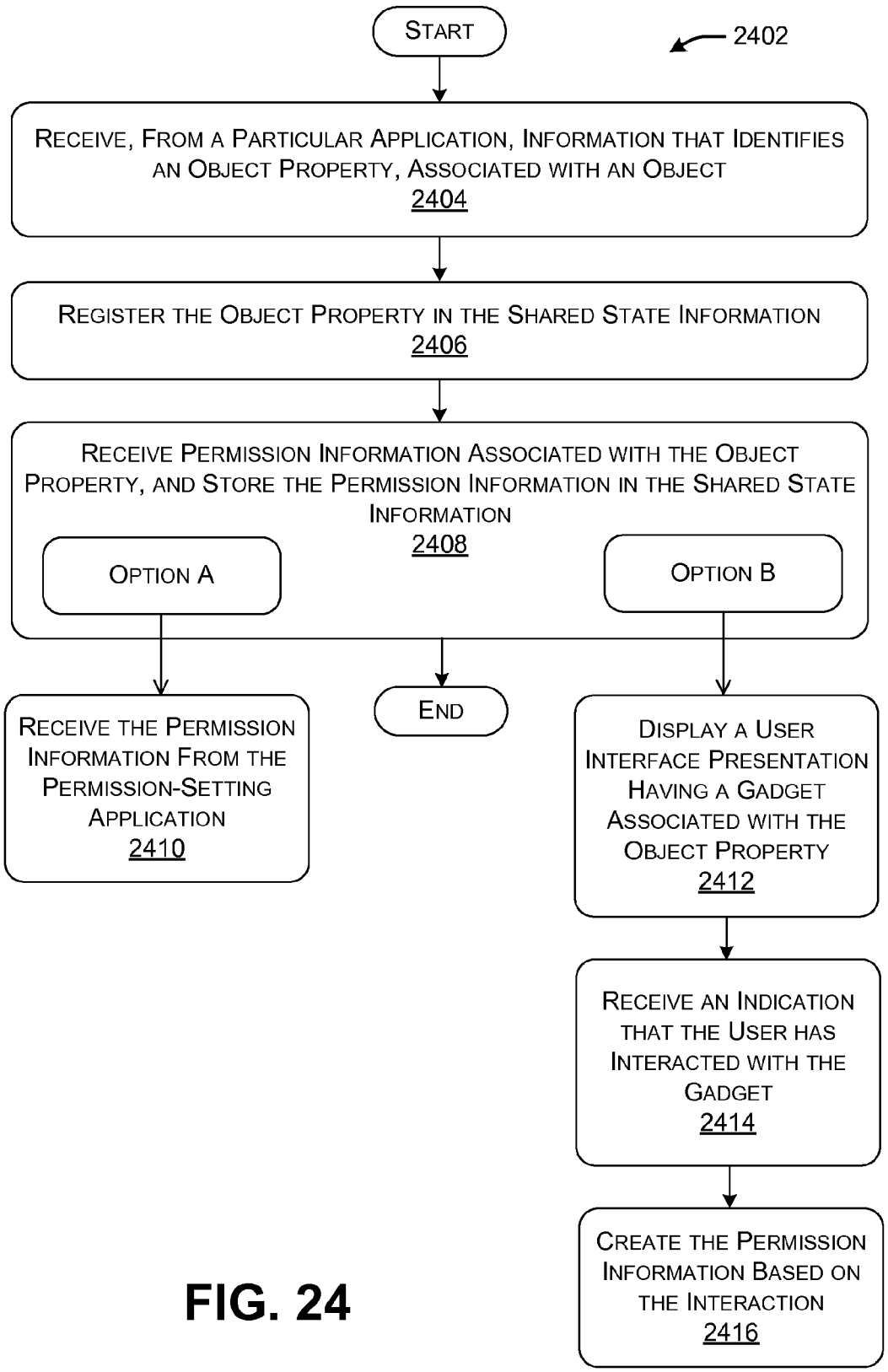
FIG. 24 is a flowchart that shows two ways of setting permission information associated with a particular object property. The permission information governs inter-application sharing.

FIG. 24 shows a procedure 2402 which outlines two ways of setting permission information for respective object properties. The permission information controls inter-application sharing of information regarding object properties. In block 2404, the shared renderer 226 receives information that identifies a particular object property. In block 2406, the shared renderer 226 registers the object property in the shared state information. In block 2408, the shared renderer 226 receives permission information associated with the identified property.

More specifically, as per option A, in block 2410, the shared renderer 226 can receive the permission information from an application which is authorized to set the permission information. For example, the application can programmatically specify the permission information in its code, and then communicate that permission information to the shared renderer 226.

As per option B, in block 2412, the shared renderer 226 can display a user interface presentation having a gadget associated with the object property. In block 2414, the shared renderer 226 can receive an indication that the user has interacted with the gadget, such as by dragging it to a region associated with a particular application or object. In block 2416, the shared renderer 226 can create permission information based on the interaction identified in block 2414. Alternatively, the shared renderer 226 can receive the permission information as a result of the user's interaction with the user interface presentation 1702 shown in FIG. 17, or some other user control panel.

Figure 25:
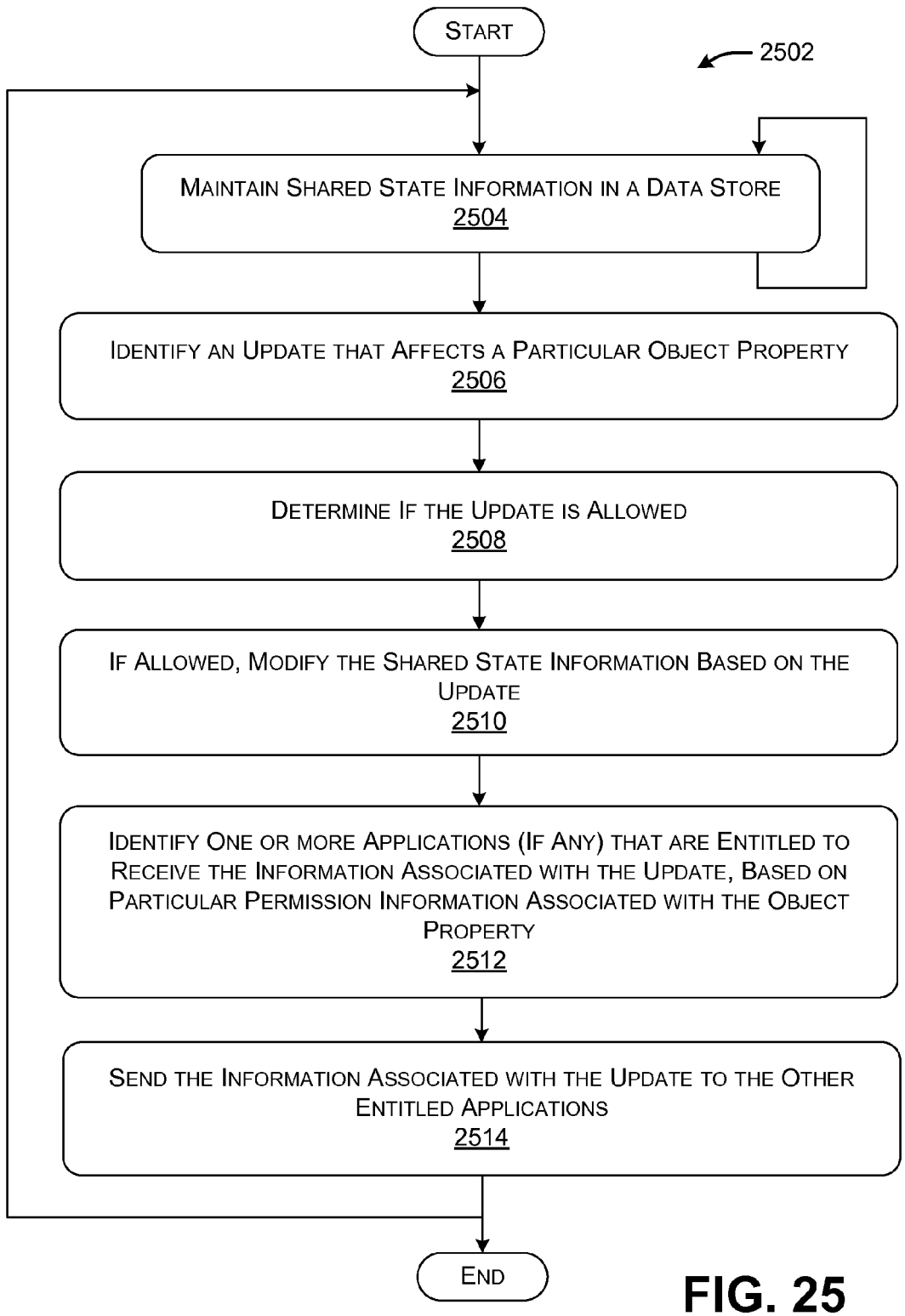
FIG. 25 is a flowchart that shows one manner of operation of the shared renderer of FIG. 14.

FIG. 25 shows a procedure 2502 that describes one manner by which the shared renderer 226 can facilitate the sharing of information regarding object properties. In block 2504, the shared renderer 226 maintains shared state information in the data store 1404. In block 2506, the shared renderer 226 identifies an update that affects a particular object property. That update may originate from an application or an internal engine provided by the shared renderer 226. In block 2508, the shared renderer 226 optionally determines if the update is allowed. For example, an update may not be allowed if it produces a result which conflicts with some other object or condition in the shared state information. In block 2510, if the update is allowed, the shared renderer 226 updates the shared state information. In block 2512, the shared renderer 226 identifies one or more applications (if any) that are entitled to receive information regarded the update, based on particular permission information associated with the object property which is being updated. In block 2514, the shared renderer 226 sends the information regarding the update to the entitled applications.

Figure 26:
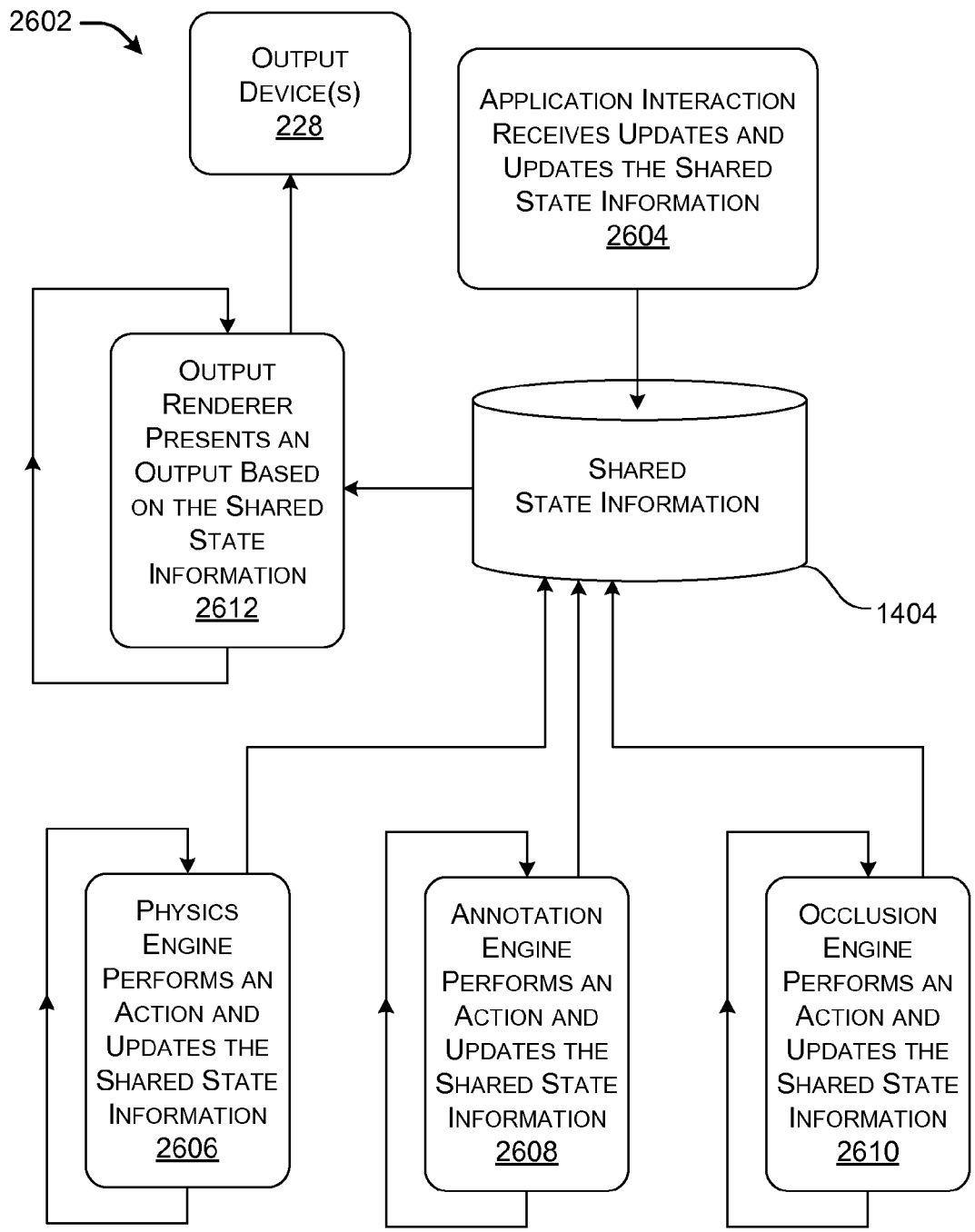
FIG. 26 is a flowchart that shows one manner by which various components of the shared renderer may contribute to shared state information, and how an output renderer may produce an output presentation based on the shared state information.

FIG. 26 is a procedure 2602 that shows one manner by which objects in the shared state information can be updated, based on various events that originate from different components of the shared renderer 226. In block 2604, the application interaction module 1402 updates the shared state information based on its interaction with the applications 204. In block 2606, the physics engine 1408 performs an action and updates the shared state information based thereon. In block 2608, the annotation engine 1410 performs an action and updates the shared state information based thereon. In block 2610, the occlusion engine 1412 performs an action and updates the shared state information based thereon. In block 2612, the output renderer 1406 presents an output presentation based on the shared state information, which it provides to one or more output devices 228. More generally, blocks 2606-2612 convey that the shared renderer 226 performs tasks which are controlled, from a high level perspective, by the applications 204, but otherwise proceed independently of the applications 204.

C. Representative Computing Functionality

FIG. 27 shows computing functionality 2702 that can be used to implement any aspect of the reality-sensing framework 202 of FIG. 2. For instance, the type of computing functionality 2702 shown in FIG. 27 can be used to implement the local computing device 304 of FIG. 3 and/or a computer server associated with the remote computing framework 306. In all cases, the computing functionality 2702 represents one or more physical and tangible processing mechanisms.

The computing functionality 2702 can include one or more processing devices 2704, such as one or more central processing units (CPUs), and/or one or more graphical processing units (GPUs), and so on.

The computing functionality 2702 can also include any storage resources 2706 for storing any kind of information, such as code, settings, data, etc. Without limitation, for instance, the storage resources 2706 may include any of: RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 2702. The computing functionality 2702 may perform any of the functions described above when the processing devices 2704 carry out instructions stored in any storage resource or combination of storage resources.

As to terminology, any of the storage resources 2706, or any combination of the storage resources 2706, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 2702 also includes one or more drive mechanisms 2708 for interacting with any storage resource, such as a hard disk drive mechanism, an optical disk drive mechanism, and so on.

The computing functionality 2702 also includes an input/output module 2710 for receiving various inputs (via input devices 2712), and for providing various outputs (via output devices 2714). Illustrative input devices include a keyboard device, a mouse input device, a touchscreen input device, a digitizing pad, one or more cameras, a voice recognition mechanism, any movement detection mechanisms (e.g., an accelerometer, gyroscope, etc.), and so on. One particular output mechanism may include a presentation device 2716 and an associated graphical user interface (GUI) 2718. Other output devices include a printer, a model-generating mechanism, a tactile output mechanism, an archival mechanism (for storing output information), and so on. The computing functionality 2702 can also include one or more network interfaces 2720 for exchanging data with other devices via one or more communication conduits 2722. One or more communication buses 2724 communicatively couple the above-described components together.

The communication conduit(s) 2722 can be implemented in any manner, e.g., by a local area network, a wide area network (e.g., the Internet), point-to-point connections, etc., or any combination thereof. The communication conduit(s) 2722 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 2702 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented system comprising:
an output device;
a shared renderer comprising an application interaction module and a data store;
an access control module; and
at least one processing device configured to execute the shared renderer and the access control module,
wherein the application interaction module is configured to interact with applications that output objects of an augmented reality experience,
wherein the data store is configured to store shared state information including the objects, property information identifying properties of the objects, and permission information identifying permissions associated with the properties of the objects,
wherein the access control module is configured to:
present a user interface presentation which provides a gadget associated with an identified object property of a first object output by a first application;
receive an indication that a user has performed a prescribed gesture directed to the gadget; and
update first permission information in the data store associated with the identified object property to indicate that a second application has access rights with respect to the identified object property of the first object;
wherein the application interaction module is further configured to:
identify an update that affects the identified object property of the first object;
access the first permission information in the data store to confirm that the second application has access rights with respect to the identified object property of the first object; and
send information regarding the update that affects the identified object property to the second application.

2. The computer-implemented system of claim 1, embodied as a single computing device.

3. The computer-implemented system of claim 1, wherein the application interaction module is further configured to:
determine that the first permission information indicates that a third application does not have access rights with respect to the identified object property of the first object; and
not send the information regarding the update to the third application.

4. The computer-implemented system of claim 1, wherein the shared renderer comprises trusted functionality and the applications comprise untrusted functionality.

5. The computer-implemented system of claim 1, wherein the identified property is a system property which is defined by the shared renderer and is independent of property definitions provided by the first application.

6. The computer-implemented system of claim 1, wherein the identified property is an application-specific property that is defined by the first application and is not independently defined by the shared renderer.

7. The computer-implemented system of claim 1, wherein at least some of the permission information is programmatically specified by the applications.

8. A computing device comprising:
an output device;
at least one processing device; and
at least one computer readable storage medium storing computer readable instructions which, when executed by the at least one processing device, cause the at least one processing device to:
interact with two or more augmented reality applications that execute on the computing device to provide an augmented reality experience that augments an environment sensed by the computing device, wherein the two or more augmented reality applications provide objects that relate to the environment sensed by the computing device;
maintain a data store that stores shared state information for the two or more augmented reality applications that execute on the computing device, the shared state information including the objects and property information identifying one or more object properties of the objects;

provide an output presentation to the output device based on the shared state information, wherein the output presentation includes the objects provided by the two or more augmented reality applications as well as a representation of the environment sensed by the computing device;

simulate movement of an individual object that is represented in the shared state information based on instructions from an individual augmented reality application;

manage behavior of the output presentation when two or more of the objects, produced by different augmented reality applications, overlap within the output presentation; and perform an update to the state information in the data store to reflect the simulated movement of the individual object and communicate the updated state information to another individual augmented reality application.

9. The computing device of claim 8, wherein the shared state information also includes permission information identifying a set of permissions associated with each object property, and wherein the computer readable instructions, when executed by the at least one processing device, cause the at least one processing device to:

confirm that the permission information indicates the another individual augmented reality application has permission to receive the updated state information before communicating the updated state information to the another individual augmented reality application.

10. The computing device of claim 8, wherein the data store is maintained using trusted functionality, whereas said two or more augmented reality applications are implemented as untrusted functionality.

11. The computing device of claim 8, wherein the output device is a display device and the two or more augmented reality applications each display different objects on the display device.

12. The computing device of claim 11, wherein the computer readable instructions, when executed by the at least one processing device, cause the at least one processing device to:

manage collisions of other objects output to the display device by the different augmented reality applications.

13. A method implemented by a computing device, the method comprising:

maintaining shared state information in a data store, the shared state information including objects output by plural augmented reality applications that execute on the computing device, wherein the objects relate to an environment sensed by the computing device;

the shared state information containing permission information, individual instances of permission information in the permission information specifying:

a sharer augmented reality application which is sharing an identified object property of a corresponding object, any augmented reality applications with which the identified object property can be shared, and at least one mode of sharing that is permitted;

identifying an update which affects a particular object property of a particular object output by a particular augmented reality application, wherein the particular object is conveyed in an output presentation with the environment sensed by the computing device;

identifying another augmented reality application that is entitled to receive information regarding the particular object property, based on corresponding permission information associated with the particular object property; and sending information regarding the particular object property to the another augmented reality application.

14. The method of claim 13, further comprising using a physics engine to simulate movement of the particular object based on instructions from the particular augmented reality application.

15. The method of claim 13, further comprising managing presentation of annotations produced by the plural augmented reality applications.

16. The method of claim 13, further comprising managing behavior of the output presentation when two or more objects, produced by two or more augmented reality applications, overlap within the output presentation.

17. The method of claim 13, further comprising providing the output presentation to a display mechanism.

18. The method of claim 17, wherein the display mechanism is a component of the computing device.

19. The method of claim 13, wherein the particular object property describes a location of the particular object.

20. The method of claim 13, wherein the particular object has an additional property and the permission information indicates that the another augmented reality application does not have access to the additional property of the particular object.

* * * * *